United States Patent
Li et al.

(10) Patent No.: US 9,411,476 B2
(45) Date of Patent: Aug. 9, 2016

(54) INDUCTION UNIT, TOUCH DETECTING ASSEMBLY AND TOUCH SENSITIVE DEVICE

(75) Inventors: Zhengang Li, Shenzhen (CN); Chen Huang, Shenzhen (CN); Yun Yang, Shenzhen (CN)

(73) Assignees: SHENZHEN BYD AUTO R&D COMPANY LIMITED, Shenzhen (CN); BYD COMPANY LIMITED, Shenzhen (CN)

( * ) Notice: Subject to any disclaimer, the term of this patent is extended or adjusted under 35 U.S.C. 154(b) by 124 days.

(21) Appl. No.: 14/131,810

(22) PCT Filed: Jul. 26, 2012

(86) PCT No.: PCT/CN2012/079182
§ 371 (c)(1),
(2), (4) Date: Feb. 20, 2014

(87) PCT Pub. No.: WO2013/013624
PCT Pub. Date: Jan. 31, 2013

(65) Prior Publication Data
US 2014/0198265 A1    Jul. 17, 2014

(30) Foreign Application Priority Data

Jul. 26, 2011 (CN) ............... 2011 1 0210959
Jul. 26, 2011 (CN) ............... 2011 1 0211018
Apr. 1, 2012 (CN) ............... 2012 1 0093658

(51) Int. Cl.
G06F 3/045 (2006.01)
G06F 3/044 (2006.01)

(52) U.S. Cl.
CPC ...... *G06F 3/044* (2013.01); *G06F 2203/04112* (2013.01)

(58) Field of Classification Search
CPC ........ G08C 21/00; G06K 11/06; G06F 3/033; G06F 3/02; G06F 3/041; G06F 3/045; G06F 3/042; G09G 5/08; G09G 5/00; G01R 27/26
USPC ................................................. 345/173–178
See application file for complete search history.

(56) References Cited

U.S. PATENT DOCUMENTS

| 2011/0095990 A1 | 4/2011 | Philipp et al. |
| 2012/0098790 A1* | 4/2012 | Han ........................ G06F 3/045 345/174 |
| 2012/0162096 A1 | 6/2012 | Lin et al. |

FOREIGN PATENT DOCUMENTS

| CN | 1708672 | 12/2005 |
| CN | 1708672 A | 12/2005 |
| CN | 101470562 A | 7/2009 |

(Continued)

*Primary Examiner* — Pegeman Karimi
(74) *Attorney, Agent, or Firm* — Troutman Sanders LLP

(57) ABSTRACT

A touch detecting assembly, a touch sensitive device, and a portable electronic apparatus are provided. The touch detecting assembly (100) comprises: a substrate (1); and a plurality of induction units (2) disposed on the substrate (1) and not intersecting with each other, each induction unit (2) comprising an induction body (20), and a first electrode (21) and a second electrode (22) connected with the induction body (20) respectively. Each induction body (20) has a plurality of empty parts (24), and the plurality of empty parts (24) are arranged in a predetermined pattern to define a current passage (25) for increasing a resistance between the first electrode (21) and the second electrode (22).

14 Claims, 24 Drawing Sheets

(56) References Cited

FOREIGN PATENT DOCUMENTS

| CN | 101918910 | | 12/2010 |
|---|---|---|---|
| CN | 101918910 | A | 12/2010 |
| CN | 101984391 | A | 3/2011 |
| CN | 202267944 | | 6/2012 |
| CN | 202267944 | U | 6/2012 |
| CN | 202422046 | | 9/2012 |
| CN | 202422046 | U | 9/2012 |
| JP | H1091350 | A | 4/1998 |
| WO | 0073984 | A1 | 12/2000 |

\* cited by examiner

INDUCTION UNIT, TOUCH DETECTING ASSEMBLY AND TOUCH SENSITIVE DEVICE

BENEFIT CLAIMS

This application is a US National Stage of International Application No. PCT/CN2010/074469, filed, which claims the benefit of CN, filed.

CROSS-REFERENCE TO RELATED APPLICATIONS

This application claims priority to and benefits of the following applications:
1) Chinese Patent Application Serial No. 201210093658.2, filed with the State Intellectual Property Office of P. R. China on Apr. 1, 2012;
2) Chinese Patent Application Serial No. 201110210959.4, filed with the State Intellectual Property Office of P. R. China on Jul. 26, 2011; and
3) Chinese Patent Application Serial No. 201110211018.2, filed with the State Intellectual Property Office of P. R. China on Jul. 26, 2011.

The entire contents of the above applications are incorporated herein by reference.

FIELD

The present disclosure relates to an electronic apparatus design and fabrication field, and more particularly to a touch detecting assembly, a touch sensitive device having the touch detecting assembly, and a portable electronic apparatus.

BACKGROUND

Currently, a touch detecting assembly (i.e., a touch screen) has been widely applied in electronic apparatuses, such as mobile phones, PDA (personal digital assistant), GPS (global positioning system), PMP (such as MP3, MP4) and panel computers. The touch screen, which has advantages of simple, convenient and humanized touch operations, will be a best human-computer interaction interface and be widely applied in portable apparatuses.

A capacitance touch detecting assembly is generally divided into two types: self-capacitance type and mutual-capacitance type. A conventional single-layer self-capacitance touch screen comprises a plurality of bar scan electrodes made from ITO (indium tin oxides) on a glass surface. As a conductive substance with a fixed resistivity, ITO has a good material coherence, which has been proved from a linearity of a resistor screen. The plurality of electrodes and surroundings such as a ground or a circuit constitute two electrodes of a capacitor respectively. One capacitor is connected into the circuit in parallel by a touch on the one capacitor by a finger or a touch pen, thus changing a total capacitance of a bar scan line. During a scanning process, each induction component is scanned by a control IC (integrated circuit) in a specific scan mode, and a touch position is determined according to a variation of capacitances between before the scanning and after the scanning, so as to realize the human-computer interaction. Generally, the capacitance touch detecting assembly works together with a TFT (thin film transistor) and a LCD (liquid crystal display) on which the capacitance touch detecting assembly is disposed.

FIG. 1 shows a conventional self-capacitance type touch detecting assembly. The self-capacitance type touch detecting assembly comprises a plurality of induction units 100' and 200' which have a diamond structure and are located in two different layers. A scanning is conducted along an X axis and a Y axis respectively, and if a capacitance variation of a certain intersection point exceeds a predetermined range, the intersection point is made as a touch point. Although a linearity of the self-capacitance type touch detecting assembly is good, ghost touch points still appear frequently, and thus it is difficult to realize a multipoint touch. In addition, since a double-layer screen is used, the structure is complicated and the cost is increased. Moreover, under a condition of a slight capacitance variation, the diamond structure may cause a coordinate drift, that is, the diamond structure may be easily affected by an external factor.

FIG. 2a shows another conventional self-capacitance type touch detecting assembly. The self-capacitance type touch detecting assembly uses a triangular screen structure. The self-capacitance type touch detecting assembly comprises: a substrate 300', a plurality of triangular induction units 400' disposed on the substrate 300', and a plurality of electrodes 500' connected with the triangular induction units 400' respectively. As shown in FIG. 2a, an ellipse 600' represents a finger. FIG. 2b shows a detecting principle of the self-capacitance type touch detecting assembly shown in FIG. 2a. As shown in FIG. 2b, an ellipse represents a finger which contacts with two adjacent triangular induction units, S1 represents a contact area between the finger and one of the two adjacent triangular induction units, and S2 represents a contact area between the finger and the other. Provided that an origin of coordinate is located at the lower-left corner, an X coordinate may be obtained by $X=S2/(S1+S2)*P$, where P is a resolution ratio. When the finger moves rightwards, because S2 does not increase linearly, there is a deviation of the X coordinate. It may be known from the detecting principle that a single end detecting is conducted for the conventional triangular induction unit, that is, the detecting is conducted only from one direction, and coordinates in the two directions are calculated by an algorithm. Although the self-capacitance type touch detecting assembly has a simple structure, an induction capacitance of the screen is not optimized, so that the capacitance variation is small, thus reducing a signal-to-noise ratio. In addition, because each induction unit has a triangular shape, when the figure moves horizontally, the contact area may not increase linearly, thus causing the deviation of the X coordinate and a poor linearity accordingly.

In addition, because the capacitance variation of a conventional capacitance induction unit is small to a femtofarad order of magnitude, a measure circuit needs to satisfy a higher requirement because of an existence of a stray capacitance. Moreover, because the stray capacitance may vary because of many factors, such as temperature, position, and distribution of internal and external electric field, the stray capacitance may interfere with or even bury a tested capacitance signal. In addition, for a single-layer capacitance, because the induction capacitance may be seriously interfered by an influence of a level signal Vcom, which is used for preventing a liquid crystal of a LCD screen from aging.

SUMMARY

The inventors of the present application recognize that an induction element of a conventional single-layer self-capacitance type touch screen has a shape of a bar. When a size of a screen is determined, a size of the bar is substantially determined. A width of the bar-shaped induction element is about 5 mm. When the width becomes larger, a linearity will become worse, and when the width becomes smaller, a number of a path induction element will be increased. A length of the bar is substantially a length of the screen. When the length of the bar is determined, a resistance between two ends of the bar is determined R=P*L/h, in which L is the length of the induction element, h is a height of the induction element and P is a block resistor (i.e., an ITO layer plated on a base material is made to be a square and the block resistor is a resistor from a left side to a right side of the square, which is a basic parameter of the ITO layer). A magnitude of the block resistor P is related to the thickness of the ITO layer. There are several limited standard values for the ITO block resistor in the field. Therefore, when the single-layer self-capacitor screen is made from a base material with a fixed ITO block resistor, a magnitude of each resistor may be calculated. However, since a principle of detecting a finger touch is to calculate a ratio of resistors, if the resistor is too large or too small, a detecting precision will be influenced. Since the parameter P is determined by the base material, and L and h are determined by a size of the screen, which may not be changed during the design, if the induction element is configured as a simple bar-shaped element, the resistor is not easy to detect.

Embodiments of the present disclosure seek to solve at least one of the problems existing in the prior art to at least some extent, particularly to solve at least one defects of a conventional self capacitor detecting assembly.

According to a first aspect of the present disclosure, a touch detecting assembly is provided. The touch detecting assembly comprises: a substrate; and a plurality of induction units disposed on the substrate and not intersecting with each other, each induction unit comprising an induction body, and a first electrode and a second electrode connected with the induction body respectively, in which each induction body has a plurality of empty parts, and the plurality of empty parts are arranged in a predetermined pattern to define a current passage for increasing a resistance between the first electrode and the second electrode.

With the touch detecting assembly according to the embodiment of the present disclosure, by forming the empty parts in the induction body, the current passage on the induction body may become narrower or longer, which is equivalent to increase L or reduce h in the formula R=P*L/h and the resistor R between the first electrode and the second electrode becomes larger, so that a magnitude of the R needed for the detecting precision may be obtained and the linearity of the induction is improved.

According to a second aspect of the present disclosure, a touch sensitive device is provided. The touch sensitive device comprises: a touch detecting assembly according to the first aspect of the present disclosure; and a control chip connected with each first electrode and each second electrode, in which the control chip is configured to apply a level signal to each first electrode and/or each second electrode to generate a current flowing in the current passage between each first electrode and each second electrode, to charge by the current a self capacitor generated by a touch of an induction body, to calculate a ratio between a first resistor between a first electrode of at least one induction unit and the self capacitor and a second resistor between a second electrode of the at least one induction unit and the self capacitor when an induction body of the at least one induction unit is detected to be touched, and to determine a touch position of the induction body of the at least one induction unit according to the ratio between the first resistor and the second resistor.

With the touch sensitive device according to the embodiment of the present disclosure, the touch position may be determined by calculating the ratio between the first resistor R1 and the second resistor R2, thus improving the detecting precision and the linearity.

According to a third aspect of the present disclosure, a portable electronic apparatus comprising a touch detecting assembly according to the first aspect of the present disclosure is provided.

According to a fourth aspect of the present disclosure, a portable electronic apparatus comprising a touch sensitive device according to the second aspect of the present disclosure is provided.

Additional aspects and advantages of the embodiments of the present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of the disclosure will become apparent and more readily appreciated from the following descriptions taken in conjunction with the drawings in which:

FIG. 2b is a diagram showing a detecting principle of the another conventional self capacitor touch detecting assembly shown in FIG. 2a;

DETAILED DESCRIPTION

Figure 1:
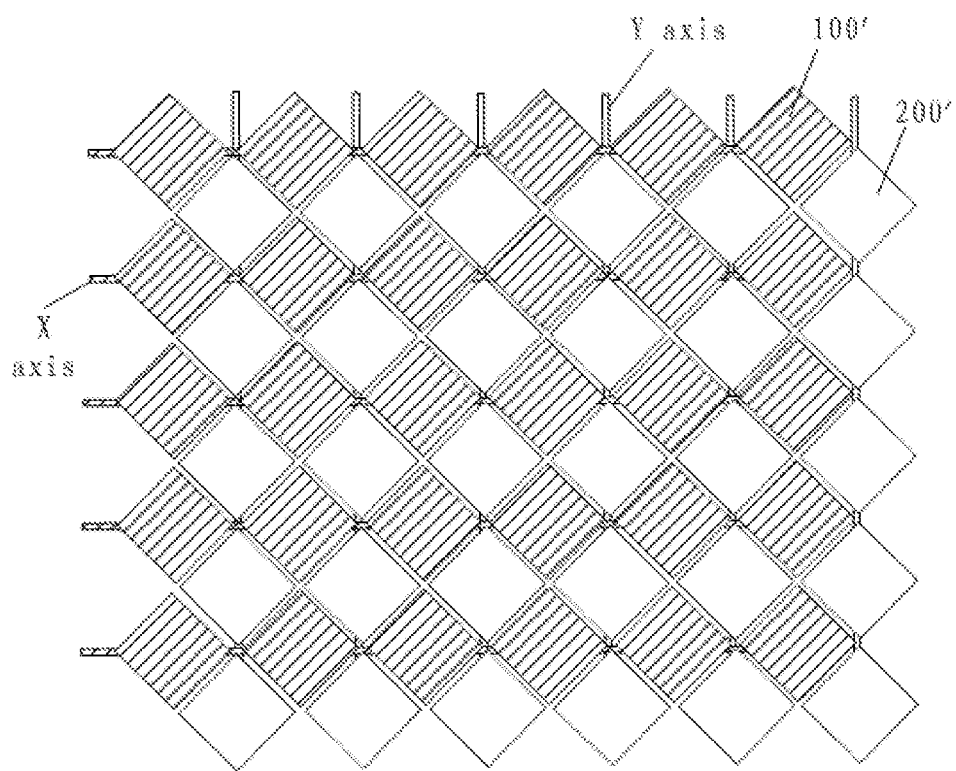
FIG. 1 is a schematic structural view of a conventional self capacitor touch detecting assembly.
Figure 2A:
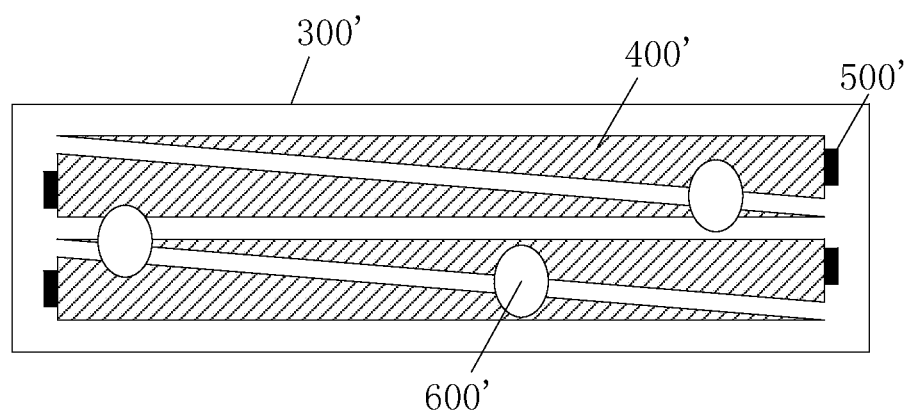
FIG. 2a is a schematic structural view of another conventional self capacitor touch detecting assembly.
Figure 2B:
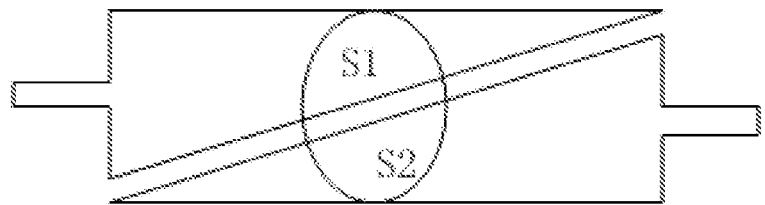

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In the specification, unless specified or limited otherwise, relative terms such as "central", "longitudinal", "lateral", "front", "rear", "right", "left", "inner", "outer", "lower", "upper", "horizontal", "vertical", "above", "below", "up", "top", "bottom" as well as derivative thereof (e.g., "horizontally", "downwardly", "upwardly", etc.) should be construed to refer to the orientation as then described or as shown in the drawings under discussion. These relative terms are for convenience of description and do not require that the present disclosure be constructed or operated in a particular orientation.

In addition, terms such as "first" and "second" are used herein for purposes of description and are not intended to indicate or imply relative importance or significance.

Terms concerning attachments, coupling and the like, such as "connected" and "coupled", refer to a relationship in which structures are secured or attached to one another either directly or indirectly through intervening structures, as well as both movable or rigid attachments or relationships, unless expressly described otherwise.

Figure 5:
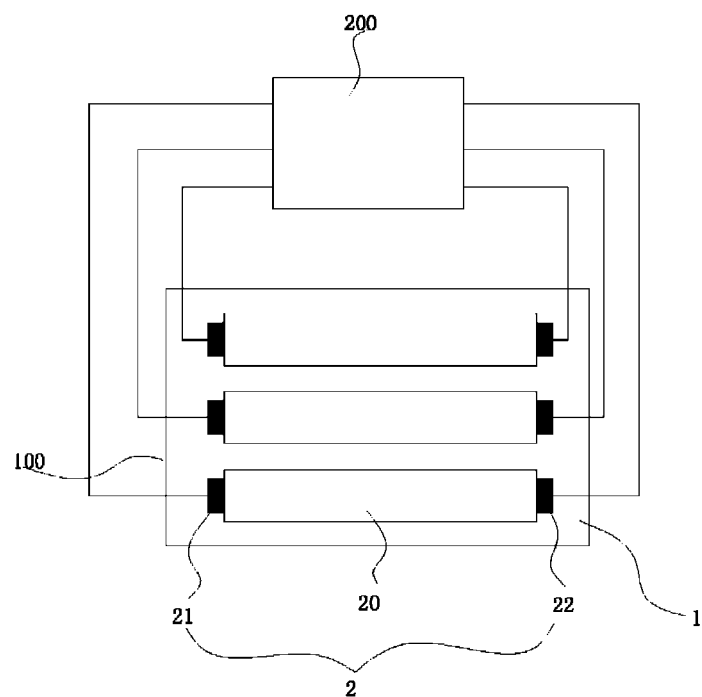
FIG. 5 is a schematic view showing a touch sensitive device according to an embodiment of the present disclosure, in which an induction body has a rectangular shape.

Firstly, a detecting principle of a touch sensitive device according to an embodiment of a second aspect of the present disclosure will be described. The touch sensitive device according to the embodiment comprises a touch detecting assembly 100 and a control chip 200. FIG. 5 is a schematic view showing a touch sensitive device according to an embodiment of the present disclosure. As shown in FIG. 5, the touch detecting assembly 100 comprises a substrate 1 and a plurality induction units 2 disposed on the substrate 1. Each induction unit 2 comprises an induction body 20, and a first electrode 21 and a second electrode 22 connected with the induction body 20 respectively. The induction units 2 are not intersecting with each other. For example, the induction units 2 may be parallel with each other or substantially parallel with each other. In the embodiment, the substrate 1 may be a single-layer substrate. However, it should be noted that a structure of the induction units 2 may not be limited to that shown in FIG. 5 and may adopt other structures. For example, some or all of the induction units 2 may have an arc shape.

The control chip 200 is connected with the first electrode 21 and the second electrode 22 respectively. The control chip 200 is configured to apply a level signal to the first electrode 21 and/or the second electrode 22 to generate a current flowing in a current passage 25 between the first electrode 21 and the second electrode 22; to charge by the current a self capacitor generated by a touch of an induction body 20; to calculate a ratio between a first resistor between a first electrode 21 of at least one induction unit 2 and the self capacitor and a second resistor between a second electrode 22 of the at least one induction unit 2 and the self capacitor when an induction body 20 of the at least one induction unit 2 is detected to be touched; and to determine a touch position of the induction body 20 of the at least one induction unit 2 according to the ratio between the first resistor and the second resistor.

In some embodiments of the present disclosure, the ratio between the first resistor and the second resistor is calculated by a ratio between a first detecting value and a second detecting value obtained by detecting from the first electrode and/or the second electrode when charging/discharging the self capacitor. The charging and the detection from the first electrode and the second electrode may be performed simultaneously or separately, and the discharging and the detection from the first electrode and the second electrode may be performed simultaneously or separately. When the control chip 200 determines that a corresponding induction unit is touched according to the first detecting value and the second detecting value, the control chip 200 calculates the ratio between the first resistor and the second resistor according to the first detecting value and the second detecting value to further determine a touch position in a first direction, and to determine the touch position in a second direction according to a position of the corresponding induction unit 2. Finally, the control chip 200 may determine the touch position on the touch detecting assembly according to the touch position in the first direction and the touch position in the second direction. A sequence of charging or discharging the induction unit in the embodiments is not limited. For example, in one embodiment, all the induction units 2 may be charged sequentially in a scanning mode and then a discharging detection is performed on all the induction units 2 sequentially. In another embodiment, the induction units 2 may be charged and discharged one by one. For example, after one induction unit 2 is charged, the discharging detection is immediately performed on the one induction unit 2. Thereafter, a same operation is performed on a next induction unit 2. In another embodiment, the control chip 200 applies level signals to the first electrode 21 and the second electrode 22 of each induction unit 2 so as to charge the self capacitor and the control chip 200 performs the charging detection from the first electrode 21 and/or the second electrode 22 so as to obtain the first charging detecting value and the second charging detecting value.

Figure 3:
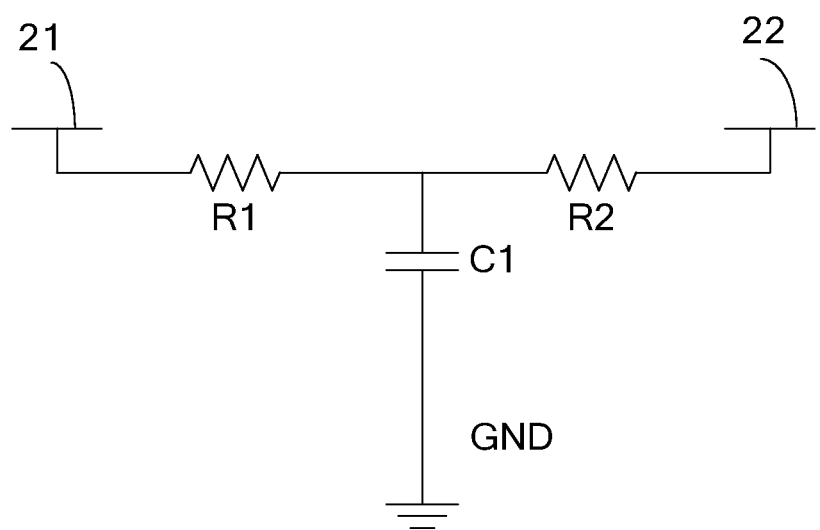
FIG. 3 is a diagram showing a detecting principle of a touch sensitive device according to an embodiment of the present disclosure.

In some embodiments of the present disclosure, the touch sensitive device of the embodiment adopts a novel self capacitor detecting method. When the induction unit is touched, a self capacitor is generated at the touch position on the touch sensitive device and the touch position may divide the induction unit into two resistors. When the self capacitor detection is performed, the touch position on the induction unit may be determined by taking into account the two resistors. FIG. 3 is a diagram showing a detecting principle of a touch sensitive device according to an embodiment of the present disclosure. When a finger 300 touches the induction unit, the induction unit is divided into the first resistor R1 and the second resistor R2 and a ratio between R1 and R2 is related to the touch position. For example, as shown in FIG. 3, when the touch position is closer to the first electrode 21, the first resistor R1 is comparatively small and the second resistor R2 is comparatively large; in contrast, when the touch position is closer to the second electrode 22, the first resistor R1 is comparatively large and the second resistor R2 is comparatively small. Therefore, by detecting the first resistor R1 and the second resistor R2, the touch position on the induction unit 2 may be determined.

In the embodiments of the present disclosure, the first resistor R1 and the second resistor R2 may be determined in various ways, for example, by detecting one or more of a current detecting value, a self capacitance detecting value, a level signal detecting value of the self capacitor and a charge variation of the self capacitor, the first resistor R1 and the second resistor R2 may be obtained based on the above detecting values. In addition, in the embodiments of the present disclosure, the above detecting values may be detected when charging the self capacitor (i.e., obtaining the first charging detecting value and the second charging detecting value), or may be detected when discharging the self capacitor (i.e., obtaining the first discharging detecting value and the second discharging detecting value). In addition, various ways may be adopted to perform the detection during the charging or discharging.

It should be noted that at least one of the charging and discharging is performed from the first electrode 21 and the second electrode 22 so as to obtain two detecting values reflecting a difference between the first resistor R1 and the second resistor R2, i.e., the first detecting value and the second detecting value. That is, during charging or discharging, there is a current flowing through the first resistor R1 and the second resistor R2 so that the first detecting value and the second detecting value detected may reflect the difference between the first resistor R1 and the second resistor R2.

In the embodiments of the present disclosure, the charging and the detection are generally needed to be performed twice, and the charging comprises the charging from the first electrode 21 and the second electrode 22 simultaneously. In some embodiments, discharging may be performed twice. For convenience, the charging and the detection are each performed twice in the following embodiments. It should be noted that performing charging and detection twice is only an example with a comparatively simple algorithm for realizing the embodiments. However, those skilled in the art may increase a number of times of charging and detection, for example, the charging and the detection may be performed three times, then the first resistor R1 is calculated according to the first time charging detecting value and the second time charging detecting value, and the second resistor R2 is calculated according to the first time charging detecting value and the third time charging detecting value.

Specifically, according to the embodiments of the present disclosure, the detecting methods comprise, but are not limited to, the following methods.

1. The first electrode 21 and the second electrode 22 of the induction unit are applied with level signals to charge the self capacitor (generated when the induction unit is touched); and a charging detection is performed from the first electrode 21 and/or the second electrode 22 to obtain a first charging detecting value and a second charging detecting value. In the embodiment, since the charging is performed from the first electrode 21 and the second electrode 22, the detection may be performed from the first electrode 21, from the second electrode 22 or from the first electrode 21 and the second electrode 22 respectively. It should be noted that in the embodiment, charging from the first electrode 21 and from the second electrode 22 may be performed simultaneously or separately. For example, a same level signal may be applied to the first electrode 21 and the second electrode 22 simultaneously to charge the self capacitor. In other embodiments, the level signals applied to the first electrode 21 and the second electrode 22 may be different; or one level signal may be applied to the first electrode 21 first and then a same or different level signal may be applied to the second electrode 22. Similarly, the detections from the first electrode 21 and the second electrode 22 may be performed simultaneously or separately. In the following embodiments, the detection and charging are performed simultaneously or separately.

2. The first electrode 21 or the second electrode 22 of the induction unit is applied with a level signal twice to charge the self capacitor twice; and after each charging, a charging detection is performed from the first electrode 21 and/or the second electrode 22 to obtain a first charging detecting value and a second charging detecting value. In the embodiment, since the charging is performed from the first electrode 21 or the second electrode 22, the detection needs to be performed from the first electrode 21 and the second electrode 22 respectively. It should be noted that in some embodiments, charging from the first electrode 21 and from the second electrode 22 may be performed simultaneously or separately. In addition, alternatively, charging may be performed from the first electrode 21 twice and detection may be performed from the first electrode 21 twice; or charging may be performed from the second electrode 22 twice and detection may be performed from the second electrode 22 twice. When the charging is performed from one electrode twice, the other electrode is grounded or connected with a large resistor to change the status of the other electrode. For example, when the level signals are applied to the first electrode 21 twice to charge the self capacitor twice, during the first time charging, the second electrode 22 is grounded and during the second time charging, the second electrode 22 is connected with a large resistor; and when the level signals are applied to the second electrode 22 twice to charge the self capacitor twice, during the first time charging, the first electrode 21 is grounded and during the second time charging, the first electrode 21 is connected with a large resistor. Thus, even if the charging is performed two times from the first electrode 21, because of a change of a status of the second electrode 22, the detection may be performed two times from the first electrode 21 to obtain the first detecting value and the second detecting value reflecting the ratio between the first resistor R1 and the second resistor R2.

3. The first electrode 21 and the second electrode 22 of the induction unit are applied with level signals to charge the self capacitor; the first electrode 21 and/or the second electrode 22 are controlled to be grounded to discharge the self capacitor; and a discharging detection is performed from the first electrode 21 and/or the second electrode 22 to obtain a first discharging detecting value and a second discharging detecting value. In the embodiment, since the charging of the self capacitor is performed from the first electrode 21 and the second electrode 22, the discharging or detection may be performed from the first electrode 21 and/or the second electrode 22. Specifically, the first electrode 21 and the second electrode 22 may be applied with level signals simultaneously or separately to charge the self capacitor. During the two times discharging, the first electrode 21 may be grounded two times respectively or the second electrode 22 may be grounded two times respectively.

4. The first electrode 21 or the second electrode 22 of the induction unit is applied with a level signal to charge the self capacitor; the first electrode 21 and the second electrode 22 are controlled to be grounded to discharge the self capacitor; and a discharging detection is performed from the first electrode 21 and/or the second electrode 22 to obtain a first discharging detecting value and a second discharging detecting value. In the embodiment, since the discharging of the self capacitor is performed from the first electrode 21 and the second electrode 22, the charging or detection may be performed from the first electrode 21 and/or the second electrode 22. In the embodiment, the charging may be performed from the first electrode 21 two times and the second electrode 22 may be grounded or connected with a large resistor; also, the charging may be performed from the second electrode 22 two times and the first electrode 21 may be grounded or connected with a large resistor.

5. The first electrode 21 or the second electrode 22 of the induction unit is applied with a level signal to charge the self capacitor; the first electrode 21 or the second electrode 22 is controlled to be grounded to discharge the self capacitor; and a discharging detection is performed from the first electrode 21 and the second electrode 22 to obtain a first discharging detecting value and a second discharging detecting value. In the embodiment, since the detection of the self capacitor is performed from the first electrode 21 and the second electrode 22, the charging or discharging may be performed from the first electrode 21 and/or the second electrode 22. In some embodiments, the charging may be performed from the first electrode 21 two times and the second electrode 22 may be grounded or connected with a large resistor; also, the charging may be performed from the second electrode 22 two times and the first electrode 21 may be grounded or connected with a large resistor.

Alternatively, based on the above embodiments, a first detection may be performed when charging the self capacitor to obtain the first charging detecting value and a second detection may be performed when discharging the self capacitor to obtain the second discharging detecting value and a ratio between the first resistor R1 and the second resistor R2 may be obtained according to the first charging detecting value and the second discharging detecting value.

It should be noted that in the embodiments of the present disclosure, a function of the first electrode 21 and the second electrode 22 are the same and the first electrode 21 and the second electrode 22 are interchangeable. Therefore, in the above embodiments, the detection may be performed from the first electrode 21 or from the second electrode 22, as long as there is a current flowing through the first resistor R1 and the second resistor R2 during detection.

The above embodiments show that there may be many variations with respect to the charging and detection. According to an embodiment of the present disclosure, the touch position is determined according to a relation (for example, ratio) between the first resistor R1 and the second resistor R2. Further, the relation between the first resistor R1 and the second resistor R2 is detected by charging and/or discharging the self capacitor. If the induction unit is not touched, no self capacitor will be generated and it will be determined that there is no touch. Therefore, in the embodiments of the present disclosure, a scanning will be repeated until the finger 300 touches the induction unit, which will not be illustrated in detail here.

In the embodiments of the present disclosure, corresponding voltages may be applied to the plurality of induction units sequentially and the detection may be performed for the plurality of induction units sequentially.

It should be noted that the above detecting methods are only some methods according to the embodiments of the present disclosure and those skilled in the art may expand, amend or modify the embodiments without departing from the spirits of the present disclosure.

Figure 4:
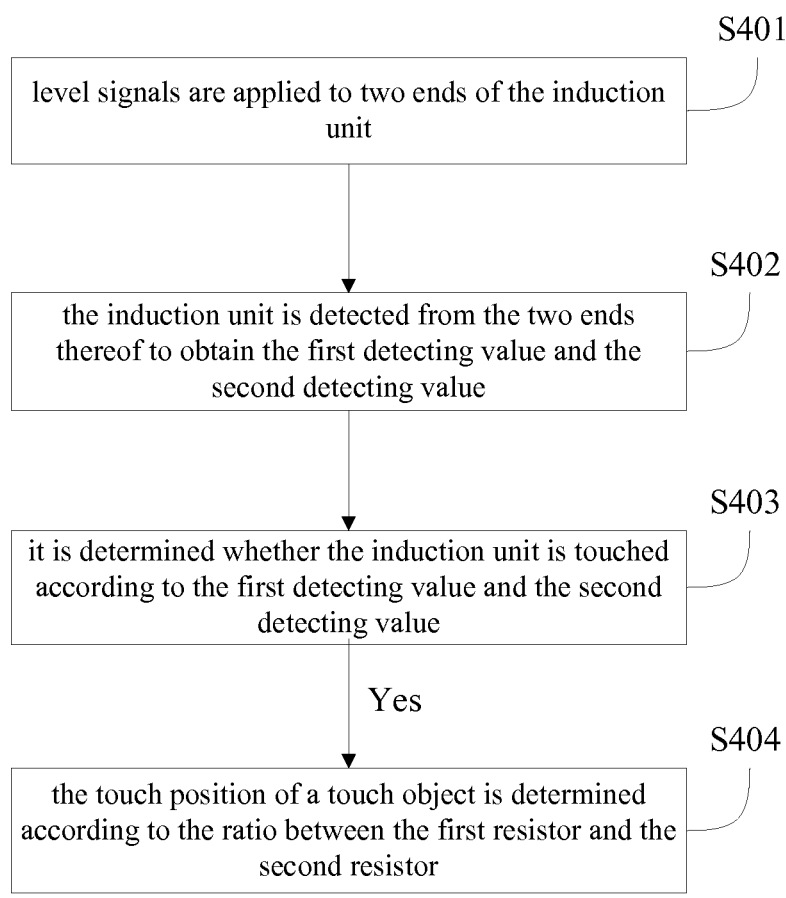
FIG. 4 is a flow chart showing a touch detecting method of a touch sensitive device according to an embodiment of the present disclosure.

FIG. 4 is a flow chart showing a touch detecting method of a touch sensitive device according to an embodiment of the present disclosure. The touch detecting method will be described with reference to the principle view of FIG. 3. The touch detecting method comprises the following steps.

In step S401, level signals are applied to two ends of the induction unit, i.e., level signals are applied to the first electrode 21 and/or the second electrode 22 of the induction unit. In the embodiment, same or different level signals may be applied to the first electrode 21 and the second electrode 22. In other embodiments, the charging may be performed two times from the first electrode 21 or the second electrode 22; the charging may be performed from the first electrode 21 for the first time and from the second electrode 22 for the second time; or the charging may be performed from the second electrode 22 for the first time and from the first electrode 21 for the second time.

If the induction unit is touched by a finger or other objects at this time, a self capacitor C1 will be generated in the induction unit (referring to FIG. 3). The self capacitor C1 may be charged by the applied level signals. In the embodiments, by charging the self capacitor C1, the detecting precision of the self capacitor C1 may be improved.

It should be noted that if level signals are applied to the two ends of the induction unit simultaneously, two capacitance detecting modules are needed to perform detection from the first electrode 21 and the second electrode 22. If the level signals are applied to the two ends of the induction unit separately, only one capacitance detecting module is needed. In one embodiment of the present disclosure, the first detecting value and the second detecting value may be the charge variations $\Delta Q1$ and $\Delta Q2$ of the self capacitor C1 detected from the first electrode 21 and/or the second electrode 22. The charge variation of the self capacitor C1 may be obtained according to $\Delta Q1$ and $\Delta Q2$, and thus the ratio between R1 and R2 may be obtained, and an X coordinate of the touch position may be calculated, and a position of the self capacitor C1 may be obtained.

In step S402, the induction unit is detected from the two ends thereof to obtain the first detecting value and the second detecting value. In the embodiment, the detection may be performed during the charging or discharging. In the above examples, the first detecting value and the second detecting value are $\Delta Q1$ and $\Delta Q2$ respectively. In the following description, $\Delta Q1$ and $\Delta Q2$ are taken as the first detecting value and the second detecting value. However, other detecting values, such as level signals or currents, which may reflect the relation between the first resistor R1 and the second resistor R2, may also be adopted. In the embodiments of the present disclosure, the detections from the first electrode 21 and from the second electrode 22 may be performed simultaneously or separately.

In one embodiment of the present disclosure, if the detections are performed simultaneously, two capacitance detecting modules are needed to detect from the first electrode 21 and the second electrode 22 simultaneously.

In another embodiment of the present disclosure, one capacitance detecting module may be used to perform the detection. Referring to step S401, after the self capacitor C1 is fully charged from the first electrode 21, the capacitance detecting module detects the self capacitor C1 from the first electrode 21, the self capacitor C1 is charged from the second electrode 22, and the capacitance detecting module detects the self capacitor C1 from the second electrode 22.

When the control chip scans the induction unit, it uses the same phase and level signal, so that for the same self capacitor C1, the charge during the charging is in reverse proportion to its resistance. Assuming the charge variations detected from the first electrode 21 and the second electrode 22 are $\Delta Q1$ and $\Delta Q2$ respectively. In the embodiments of the present disclosure, the capacitance detecting module may be any known capacitance detecting module in the art. In an embodiment, if two capacitance detecting modules are used, they may share many means, so that the overall power consumption of the control chip may not be increased.

In step S403, it is determined whether the induction unit is touched according to the first detecting value and the second detecting value. Specifically, in one embodiment, it may be determined whether the induction unit is touched by judging whether the charge variations $\Delta Q1$ and $\Delta Q2$ are larger than a threshold. Of course, in other embodiments, other judging methods may be used, for example, a method of judging whether the charge variations $\Delta Q1$ and $\Delta Q2$ are smaller than a threshold. If the charge variations $\Delta Q1$ and $\Delta Q2$ are smaller than a threshold, it is determined that the induction unit is touched. Similarly, the threshold may be determined according to a size and type of the touch detecting assembly and according to a size of the induction unit.

In step S404, if it is determined that the induction unit is touched, a ratio between a first resistor between the first electrode 21 and the self capacitor and a second resistor between the second electrode 22 and the self capacitor may be calculated. The touch position of a touch object (for example, a finger) may be determined according to the ratio between the first resistor and the second resistor. In the embodiments, the ratio between the first resistor and the second resistor is calculated according to the ratio between the first detecting value and the second detecting value obtained by detecting from the first electrode 21 and/or the second electrode 22 when charging/discharging the self capacitor. Therefore, the coordinates of the self capacitor C1 on the induction unit is $\Delta Q2/(\Delta Q1+\Delta Q2)$.

In the embodiments, if the induction body of the induction unit has a substantially U shape or a substantially L shape, the touch position on the induction body may be determined according to the ratio between the first resistor and the second resistor, which will be described in detail with reference to examples. However, in other embodiments, if the induction body has a substantially rectangular shape, then in step S404, only the touch position in the first direction on the induction body of the induction unit may be calculated and the first direction may be a length direction of the induction body (for example, a horizontal direction of the induction body).

If the induction body has a rectangular shape, the touch position in the second direction may further need to be determined. In one embodiment, the first direction is the length direction of the induction body, the second direction is the direction orthogonal to the first direction, and the induction body is disposed horizontally or vertically.

Specifically, the touch position in the second direction may be calculated according to the centroid algorithm, which will be briefly discussed below.

In slide bar and touch pad applications, a position of a finger (or other capacitive objects) may be determined according to the induction units touched. A contact area of a finger on the slide bar or touch pad is usually larger than any induction unit. In order to use a center to calculate the touched position, it is effective to scan this array to verify the touch position, and a requirement for the number of adjacent induction units is that the signal is larger than a predetermined touch threshold. After the strongest signal has been found, the strongest signal and those adjacent signals larger than the touch threshold are used to compute the center.

$$N_{Cent} = \frac{n_{i-1}(i-1) + n_i i + n_{i+1}(i+1)}{n_{i-1} + n_i + n_{i+1}}.$$

$N_{Cent}$ is an identifier of a central induction unit, n is the number of the touched induction units, i is a sequence of the touched induction unit and i is larger than or equal to 2.

For example, when the finger touches the first path, the capacitance change amount of the first path is y1, the capacitance change amount of the second path is y2 and the capacitance change amount of the third path is y3, among which y2 is the largest. Then, the coordinate Y may be calculated as:

$$Y = \frac{y1*1 + y2*2 + y3*3}{y1 + y2 + y3}.$$

Embodiments according to a first aspect of the present disclosure provide a touch detecting assembly according to the above description. The touch detecting assembly 100 will be described with reference to FIGS. 6-41.

The touch detecting assembly 100 comprises a substrate 1 and a plurality of induction units 2. The plurality of induction units 2 are disposed on the substrate and not intersecting with each other. In the embodiments, the induction units 2 may be parallel with each other. Alternatively, the induction units 2 may be substantially parallel with each other. For example, one induction unit is inclined by a predetermined angle with respect to another induction unit, but every two induction units are at least not intersecting with each other on the substrate. It should be noted that the structure of the induction units 2 may not be limited to that shown in FIG. 5 and may adopt other structures. For example, some or all of the induction units 2 may have an arc shape.

Alternatively, the substrate 1 has a substantially rectangular shape. Here, "a substantially rectangular shape" may be understood as the opposite sides of the substrate 1 may not be absolutely parallel with each other and may form a small angle and each side of the substrate 1 may not need to be absolutely straight. Each induction unit 2 comprises an induction body 20, and a first electrode 21 and a second electrode 22 connected with the induction body 20 respectively. The first electrode 21 and the second electrode 22 are connected with corresponding pins of the control chip 200. The induction body 20 has a plurality of empty parts 24 and the plurality of empty parts 24 are arranged in the induction body 20 in a predetermined pattern to define a current passage 25 for increasing a resistance R between the first electrode 21 and the second electrode 22, and the current passage 25 is used for allowing the current to flow therein. In some embodiments, each empty part 24 penetrates through the induction body 20 in a thickness direction of the induction body 20. Since the thickness of the induction body 20 is comparatively small, it is convenient to make the empty parts 24 penetrate through the induction body 20 in the thickness direction.

By forming the empty parts 24 in the induction body 20, the current passage 25 in the induction body 20 is made to be narrower or longer, which is equivalent to increase L or reduce h in the formula R=P*L/h and the resistor R between the first electrode 21 and the second electrode 22 becomes larger, so that a magnitude of the R needed for the detecting precision may be obtained and the linearity of the induction is improved. A size of pattern or line of each empty part and a density of the empty parts may influence the magnitude of the resistance R. In order not to influence the self capacitor, the patterns or lines of the empty parts may need to be as thin as possible. This is because if the patterns or lines of the empty parts are too thick, a contact area between the finger and the induction body may be reduced and the change amount of the self capacitance touched by the finger may be influenced.

It should be noted that in the description, "the plurality of empty parts 24 are arranged in the induction body 20 in a predetermined pattern" should be construed broadly, i.e., the plurality of empty parts 24 are arranged into arrays with predetermined shapes in the induction body 20. For example, the plurality of empty parts 24 may be arranged into a linear array one by one along the length direction of the induction body 20. Alternatively, the plurality of empty parts 24 may comprise two shapes alternately arranged along the length direction of the induction body 20. Specifically, the induction body 20 and the empty parts 24 will be described in detail in the following embodiments.

Figure 6:
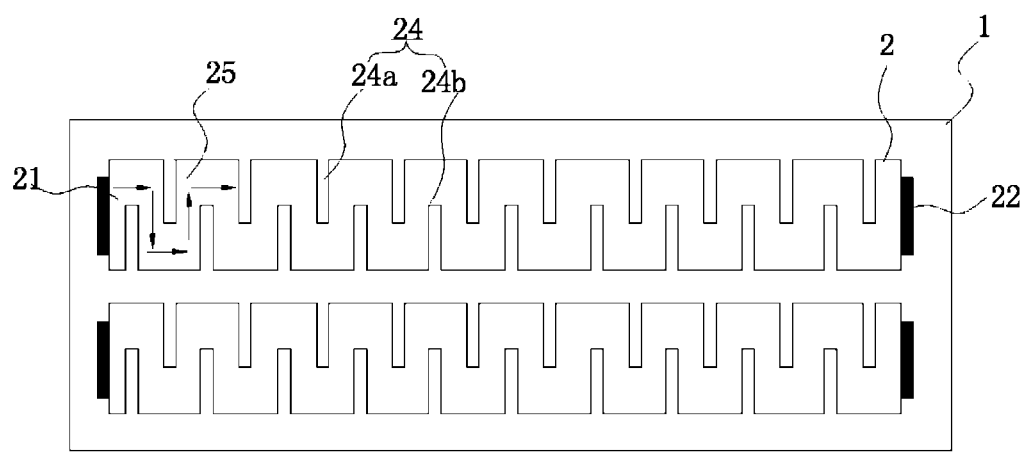
FIGS. 6-17 are schematic views showing different examples of a touch detecting assembly according to embodiments of the present disclosure, in which the induction bodies have a rectangular shape.

In one embodiment, the induction body 20 has a substantially rectangular shape and has a first end (i.e., a left end in FIG. 6) and a second end (i.e., a right end FIG. 6). The first electrode 21 is connected with the first end of the induction body 20 and the second electrode 22 is connected with the second end of the induction body 20. In the embodiment, because of the rectangular shape, when the finger moves horizontally or vertically, the linearity may be good. In addition, a distance between every two adjacent induction bodies 20 may be the same so as to improve the calculation speed.

In one embodiment, the plurality of empty parts 24 are uniformly arranged at intervals. For example, when the induction body 20 is rectangular, the plurality of empty parts 24 are uniformly arranged along the length direction of the induction body 20. That is to say, the plurality of empty parts 24 are uniformly arranged along an extending direction of the current passage 25 in the induction body 20 so as to increase the linearity and to improve the calculation speed and the detection precision.

In another embodiment, the induction body 20 comprises a first induction body part 201 and a second induction body part 202. The first induction body part 201 and the second induction body part 202 may both have a rectangular shape and form a predetermined angle. For example, the first induction body part 201 and the second induction body part 202 may be orthogonal to each other to form a substantially L shape (simply called an L-shaped induction body below), in which a second end of the first induction body part 201 is connected with a first end of the second induction body part 202, the first electrode 21 is connected with a first end of the first induction body part 201 and the second electrode 22 is connected with a second end of the second induction body part 202. As mentioned above, the first induction body part 201 and the second induction body part 202 may be orthogonal to each other. Therefore, the shape of the induction body may be more regular so as to increase a contact area on the touch detecting assembly and to improve the detecting linearity. Alternatively, the size of the first induction body part 201 is the same as that of the second induction body part 202 so as to increase the calculation speed.

In one embodiment, the induction body 20 comprises a first induction body part 201, a second induction body part 202 and a third induction body part 203. The first induction body part 201 and the second induction body part 202 are connected with two ends of the third induction body part 203 respectively and located at the same side of the third induction body part 203. The first induction body part 201 and the second induction body part 202 form a predetermined angel with the third induction body part 203 respectively. In one embodiment, the first induction body part 201, the second induction body part 202 and the third induction body part 203 may all have a rectangular shape and the first induction body part 201 and the second induction body part 202 may both be orthogonal to the third induction body part 203 respectively (simply called a U-shaped induction body below). The first electrode 21 is connected with a first end of the first induction body part 201 and the second electrode 22 is connected with a second end of the second induction body part 202. Therefore, the shape of the induction body may be more regular so as to increase a contact area on the touch detecting assembly and to improve the detecting linearity. Alternatively, the size of the first induction body part 201 is the same as that of the second induction body part 202 so as to increase the calculation speed.

The touch detecting assembly 100 having a substantially rectangular shape induction body 20 according to embodiments of the present disclosure will be described with reference to FIGS. 6-17.

The induction body 20 has a first end and a second end, a first electrode 21 is connected with the first end of the induction body 20, a second electrode 22 is connected with the second end of the induction body 20, and a current passage 25 extends between the first end and the second end in a curve so that a length L of the current passage 25 in an extending direction of the current passage 25 is larger than a length of the induction body 20. That is, the resistance of the induction body 20 may be increased. For example, when the induction body 20 has a rectangular shape, a length direction of the induction body 20 is a direction from the first end to the second end of the induction body 20. As shown in FIGS. 7-10, the first electrode 21 is connected with the first end (i.e., a left end of a rectangle in any one of FIGS. 7-10) of the induction body 20, a second electrode 22 is connected with the second end (i.e., a right end of a rectangle in any one of FIGS. 7-10) of the induction body 20, and a current flowing direction is shown by arrows in any one of FIGS. 7-10.

With the touch detecting assembly 100 according to an embodiment of the present disclosure, by forming the empty parts 24 in the induction body 20, the current passage 25 on the induction body 20 is made to be narrower or longer, which is equivalent to increase L or reduce h in the formula $R=P*L/h$ and the resistance R between the first electrode 21 and the second electrode 22 becomes larger, so that a magnitude of the R needed for the detecting precision may be obtained and the linearity of the induction is improved.

In some embodiments of the present disclosure, the plurality of empty parts 24 are divided into a first group and a second group, empty parts 24a in the first group are linearly arranged in the extending direction, empty parts 24b in the second group are linearly arranged in the extending direction, empty parts 24a in the first group correspond to and alternate with empty parts 24b in the second group one by one in the extending direction, and each empty part 24a in the first group partly overlaps a corresponding empty part 24b in the second group in a direction orthogonal to the extending direction.

In other words, each empty part 24a in the first group is disposed between two adjacent empty parts 24b in the second group, each empty part 24a in the first group extends from an upper edge of each induction body 20 toward a lower edge of the induction body 20 in a width direction of the induction body 20 and is spaced apart from the lower edge of the induction body 20. Each empty part 24b in the second group extends from the lower edge of the induction body 20 toward the upper edge of the induction body 20 in the width direction of the induction body 20 and is spaced apart from the upper edge of the induction body 20.

A sum of a length of each empty part 24a in the first group and a length of each empty part 24b in the second group is larger than a width of the induction body 20, and each empty part 24a in the first group partly overlaps a corresponding empty part 24b in the second group in the width direction of the induction body 20.

Here, the phrase "partly overlap" means that adjacent empty part 24a and empty part 24b are spaced apart from each other in the length direction of the induction body 20 and their projections on a plane orthogonal to the length direction partly overlap each other. In other words, when viewed from the length direction of the induction body 20, the empty parts 24a and the empty parts 24b partly overlap.

In a first example, each empty part 24 may have a rectangular shape, as shown in FIG. 6. That is, in this example, the empty parts 24a in the first group and the empty parts 24b in the second group each have a rectangular shape. The empty parts 24a in the first group alternate with the empty parts 24b in the second group one by one in a left and right direction (i.e., the length direction of the induction body 20), and the empty parts 24a in the first group and the empty parts 24b in the second group partly overlap in an up and down direction (i.e., the width direction of the induction body 20). In other words, projections of the empty parts 24a in the first group and the empty parts 24b in the second group on a plane orthogonal to the left and right direction partly overlap each other.

Certainly, the present disclosure is not limited to this. In other examples, each empty part 24 may also have a substantially I shape or a substantially H shape (not shown).

Figure 7:
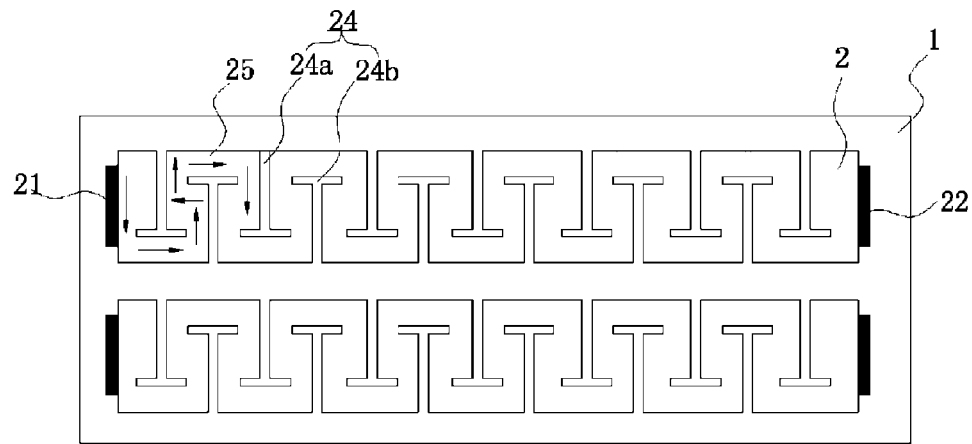

In some examples, each empty part 24a in the first group has a substantially inverted T shape, and each empty part 24b in the second group has a substantially T shape. That is, as shown in FIG. 7, the substantially inverted T-shaped empty parts 24a in the first group are spaced apart from each other in a left and right direction, the substantially T-shaped empty parts 24b in the second group are spaced apart from each other in the left and right direction, the substantially T-shaped empty parts 24b in the second group alternate with the substantially inverted T-shaped empty parts 24a in the first group, and the substantially inverted T-shaped empty parts 24a in the first group and the substantially T-shaped empty parts 24b in the second group partly overlap in an up and down direction.

Alternatively, an upper end of each empty part 24a in the first group is connected with the upper edge of the induction body 20, and a lower end of each empty part 24b in the second group is connected with the lower edge of the induction body 20. When a control chip 200 applies a level signal to each first electrode 21 and/or each second electrode 22 to generate a current flowing in a direction as shown by arrows in FIG. 7, the current flows in a curve, so that a path of the current passage 25 may become longer. Therefore, L in the formula of R=P*L/h may be increased, so that a resistance R between each first electrode 21 and each second electrode 22 may become larger. Certainly, the present disclosure is not limited to this. Alternatively, the upper end of each empty part 24a in the first group may be connected with the lower edge of the induction body 20, and the lower end of each empty part 24b in the second group may be connected with the upper edge of the induction body 20 (not shown).

In other examples, each empty part 24a in the first group has a substantially L shape, each empty part 24b in the second group has a substantially 7 shape, the empty parts 24a in the first group and the empty parts 24b in the second group form a plurality of pairs of L-7 empty parts 24, and a substantially L-shaped empty part 24a and a substantially 7-shaped empty part 24b in each pair are opposite to each other, partly cross each other in the extending direction and partly overlap with each other in a direction orthogonal to the extending direction.

Figure 8:
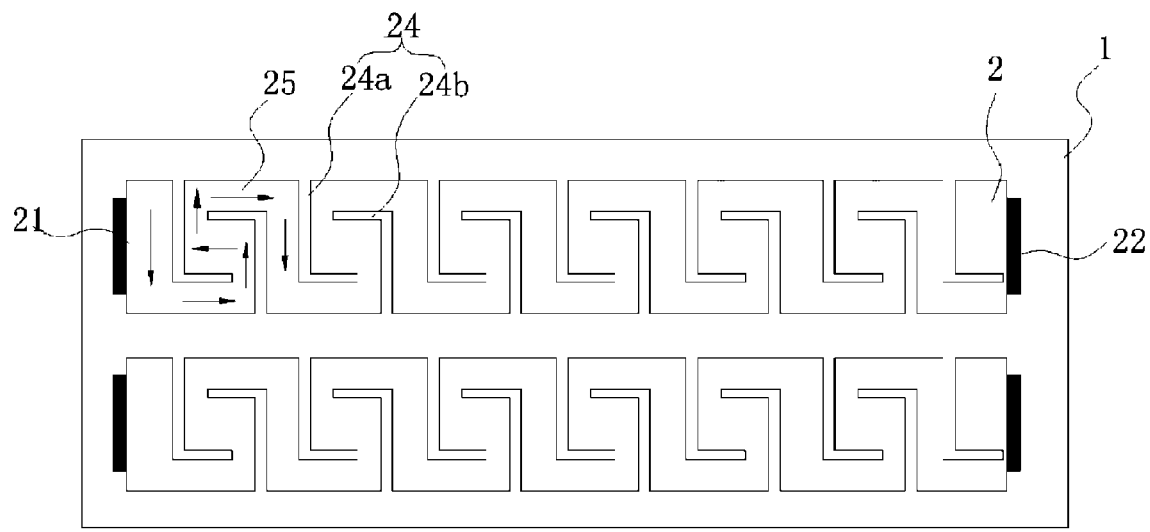

That is, as shown in FIG. 8, the substantially L-shaped empty parts 24a in the first group are spaced apart from each other in a left and right direction, the substantially 7-shaped empty parts 24b in the second group are spaced apart from each other in the left and right direction, the substantially L-shaped empty parts 24a in the first group cross the substantially 7-shaped empty parts 24b in the second group to form the plurality of pairs of empty parts, and the empty part 24a and the empty part 24b in each pair are opposite to each other and partly overlap in an up and down direction.

In this embodiment, the phrase "partly overlap" means that the first limbs (i.e., vertical limbs in FIG. 8) of the empty part 24a and the empty part 24b in each pair are spaced apart from each other in the length direction of the induction body 20 and their projections on a plane orthogonal to the length direction of the induction body 20 (i.e., the vertical plane) partly overlap. In addition, the term "cross" means that the second limbs (i.e., horizontal limbs in FIG. 8) of the empty part 24a and the empty part 24b in each pair are spaced apart from each other in the width direction of the induction body 20 and their projections on a plane orthogonal to the width direction of the induction body 20 (i.e., the horizontal plane) partly overlap each other.

Alternatively, an upper end of each empty part 24a in the first group is connected with the upper edge of the induction body 20, and a lower end of each empty part 24b in the second group is connected with the lower edge of the induction body 20. When a control chip 200 applies a level signal to each first electrode 21 and/or each second electrode 22 to generate a current flowing in a direction as shown by arrows in FIG. 8, the current flows in a curve, so that a path of the current passage 25 may become longer. Therefore, L in the formula of R=P*L/h may be increased, so that a resistance R between each first electrode 21 and each second electrode 22 may become larger. Certainly, the present disclosure is not limited to this. Alternatively, the upper end of each empty part 24a in the first group may be connected with the lower edge of the induction body 20, and the lower end of each empty part 24b in the second group may be connected with the upper edge of the induction body 20 (not shown).

Figure 9:
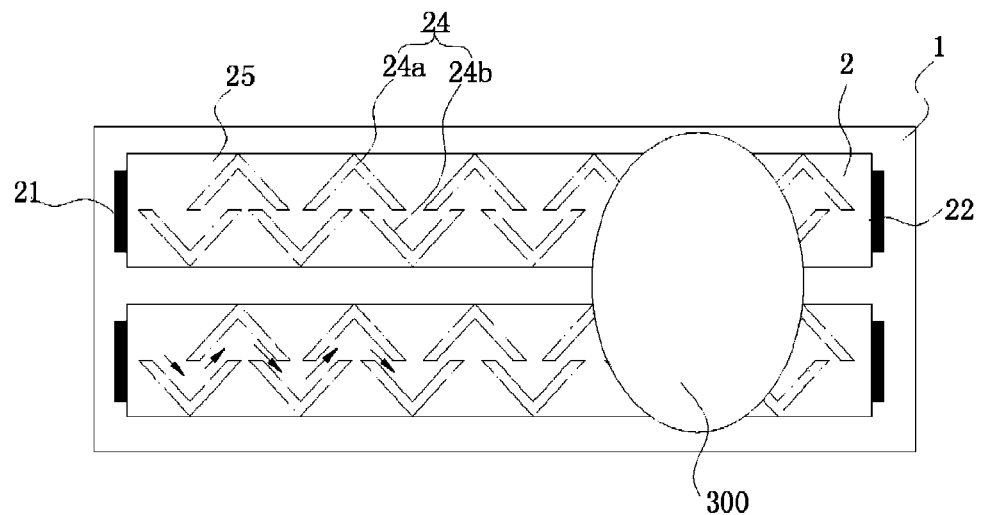

In some examples, each empty part 24a in the first group has a substantially inverted V shape, each empty part 24b in the second group has a substantially V shape, and each empty part 24a in the first group crosses two adjacent limbs of two adjacent empty parts 24b in the second group in the extending direction. That is, as shown in FIG. 9, the substantially inverted V-shaped empty parts 24a in the first group are spaced apart from each other in the left and right direction, the substantially V-shaped empty parts 24b in the second group are spaced apart from each other in the left and right direction, and the substantially inverted V-shaped empty parts 24a in the first group alternate with the substantially V-shaped empty parts 24b in the second group, so that each empty part 24a in the first group crosses two adjacent limbs of two adjacent empty parts 24b in the second group below the each empty part 24a in the first group in the left and right direction.

An upper end of each empty part 24a in the first group is connected with the upper edge of the induction body 20, and a lower end of each empty part 24b in the second group is connected with the lower edge of the induction body 20. When a control chip 200 applies a level signal to each first electrode 21 and/or each second electrode 22 to generate a current flowing in a direction as shown by arrows in FIG. 9, the current flows in a curve, so that a path of the current passage 25 may become longer. Therefore, L in the formula of R=P*L/h may be increased, so that a resistance R between each first electrode 21 and each second electrode 22 may become larger.

Figure 10:
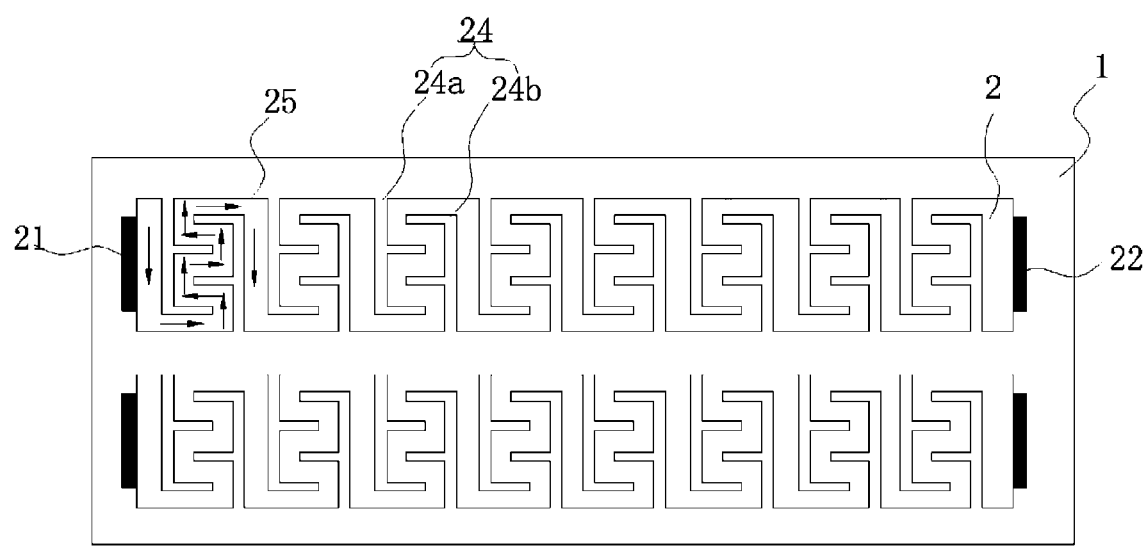

In some examples, each empty part 24a in the first group has a substantially F shape, each empty part 24b in the second group has a substantially inverted F shape. Empty parts 24a in the first group and empty parts 24b in the second group form a plurality of pairs of F-inverted-F empty parts 24, and a substantially F-shaped empty part 24a and a substantially inverted F-shaped empty part 24b in each pair cross each other and partly overlap with each other in a direction orthogonal to the extending direction. That is, as shown in FIG. 10, the substantially F-shaped empty parts 24a in the first group are spaced apart from each other in a left and right direction, the substantially inverted F-shaped empty parts 24b in the second group are spaced apart from each other in the left and right direction, the substantially F-shaped empty parts 24a in the first group alternate with the substantially inverted F-shaped empty parts 24b in the second group to form the plurality of pairs of F-inverted-F empty parts 24, and the empty part 24a and the empty part 24b in each pair are opposite to each other and partly overlap in an up and down direction.

In this embodiment, the phrase "partly overlap" means that the first limbs (i.e., vertical limbs in FIG. 10) of the empty part 24a and the empty part 24b in each pair are spaced apart from each other in the length direction of the induction body 20 and their projections on a plane orthogonal to the length direction of the induction body 20 (i.e., the vertical plane) partly overlap. In addition, the term "cross" means that the second limbs (i.e., the horizontal limbs in FIG. 10) of the empty part 24a and the empty part 24b in each pair are spaced apart from and alternated with each other in the width direction of the induction body 20 and their projections on a plane orthogonal to the width direction of the induction body 20 (i.e., the horizontal plane) partly overlap each other. In other words, for each pair of the empty part 24a and the empty part 24b, each short limb of the empty part 24a is partly inserted into adjacent short limb of the empty part 24b.

Alternatively, an upper end of each empty part 24a in the first group is connected with the upper edge of the induction body 20, and a lower end of each empty part 24b in the second group is connected with the lower edge of the induction body 20. When a control chip 200 applies a level signal to each first electrode 21 and/or each second electrode 22 to generate a current flowing in a direction as shown by arrows in FIG. 10, the current flows in a curve, so that a path of the current passage 25 may become longer. Therefore, L in the formula of R=P*L/h may be increased, so that a resistance R between each first electrode 21 and each second electrode 22 may become larger. Certainly, the present disclosure is not limited to this. Alternatively, the upper end of each empty part 24a in the first group may be connected with the lower edge of the induction body 20, and the lower end of each empty part 24b in the second group may be connected with the upper edge of the induction body 20 (not shown).

In some embodiments of the present disclosure, each induction body 20 has a first end and a second end, a first electrode 21 is connected with the first end of the induction body 20, a second electrode 22 is connected with the second end of the induction body 20, and a current passage 25 extends between the first end and the second end of the induction body 20 in a curve, so that a length L of the current passage 25 in an extending direction of the current passage 25 is larger than a length of the induction body 20.

The current passage 25 extends between the first end and the second end of the induction body 20, and a cross-sectional area of the current passage 25 in a plane orthogonal to the extending direction of the current passage 25 is less than that of the induction body 20 in the plane. In other words, a width h of the current passage 25 in an up and down direction is smaller than a width of the induction body 20. For example, when the induction body 20 has a rectangular shape, a length direction of the induction body 20 is a direction from the first end to the second end of the induction body 20. As shown in FIGS. 11-14, the first electrode 21 is connected with the first end (i.e., the left end of a rectangle in any one of FIGS. 11-14) of the induction body 20, the second electrode 22 is connected with the second end (i.e., a right end of a rectangle in any one of FIGS. 11-14) of the induction body 20, and a current flowing direction is shown by arrows in any one of FIGS. 11-14.

With the touch detecting assembly 100 according to the embodiments of the present disclosure, by forming the empty parts 24 in the induction body 20, the current passage 25 on the induction body 20 is made to be narrower or longer, which is equivalent to increase L or reduce h in the formula R=P*L/h and the resistor R between the first electrode 21 and the second electrode 22 becomes larger, so that a magnitude of the R needed for the detecting precision may be obtained and the linearity of the induction is improved.

Figure 11:
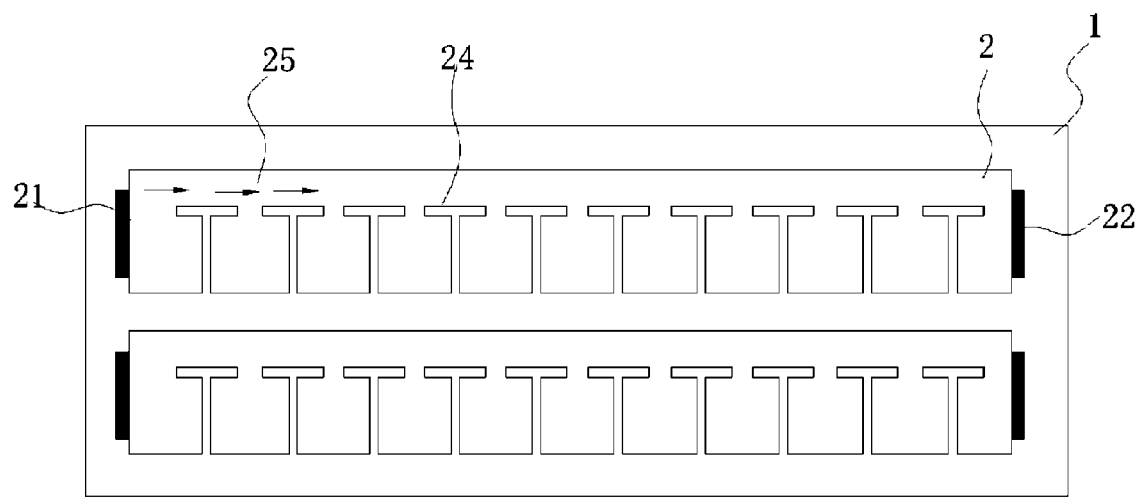
Figure 12:
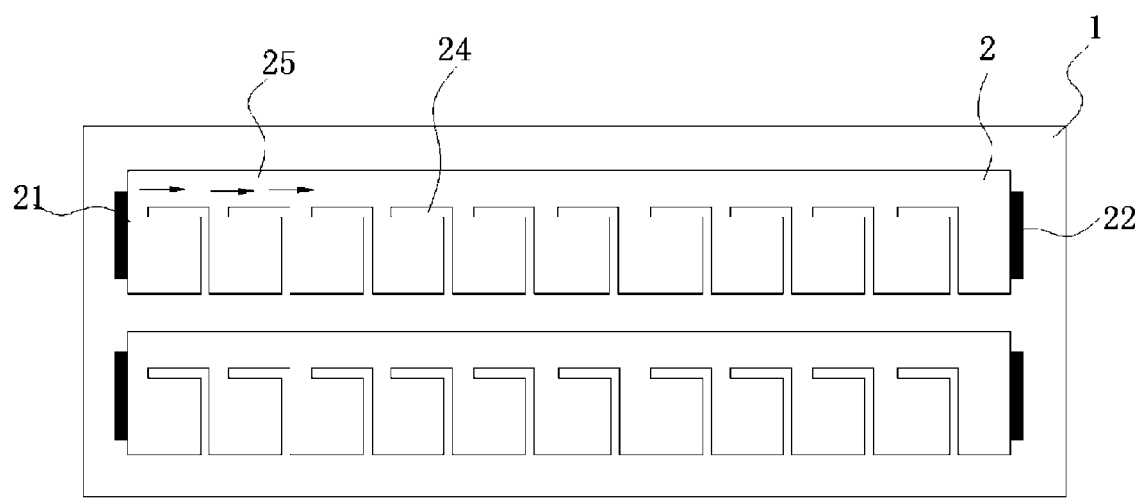

In one example, the current passage 25 is adjacent to one edge of the induction body 20 extending in the extending direction of the current passage 25. Alternatively, as shown in FIGS. 11-12, each empty part 24 has a substantially T shape or a substantially L shape. Certainly, the present disclosure is not limited to this. Each empty part 24 may also have other shapes such as a substantially rectangular shape, a substantially U shape, a substantially H shape, or a substantially I shape (not shown). Alternatively, the current passage 25 is adjacent to an upper edge of the induction body 20 and extends in a left and right direction, and a current flowing direction is shown by arrows in FIG. 11 or 12. Certainly, the current passage 25 may be adjacent to a lower edge of the induction body 20 and may extend in the left and right direction (not shown).

In another example, the current passage 25 is adjacent to a central line of the induction body 20 extending in the extending direction of the current passage 25. The plurality of empty parts 24 are divided into a first group and a second group, empty parts 24a in the first group are linearly arranged in the extending direction, empty parts 24b in the second group are linearly arranged in the extending direction, empty parts 24a in the first group and empty parts 24b in the second group form a plurality of pairs of empty parts, an empty part 24a in the first group and an empty part 24b in the second group in each pair are opposite to each other in a direction orthogonal to the extending direction of the current passage 25, and the current passage 25 is defined between the empty part 24a in the first group and the empty part 24b in the second group in each pair.

In some embodiments, an upper end of each empty part 24a in the first group is connected with the upper edge of the induction body 20, and a lower end of each empty part 24b in the second group is connected with the lower edge of the induction body 20. When a control chip 200 applies a level signal to each first electrode 21 and/or each second electrode 22 to generate a current flowing in a direction as shown by arrows in FIG. 13 or 14, the current flows in a curve, so that a width of the current passage 25 in an up and down direction may be reduced. That is, h in the formula of R=P*L/h may be reduced, so that a resistance R between each first electrode 21 and each second electrode 22 may become larger.

Figure 13:
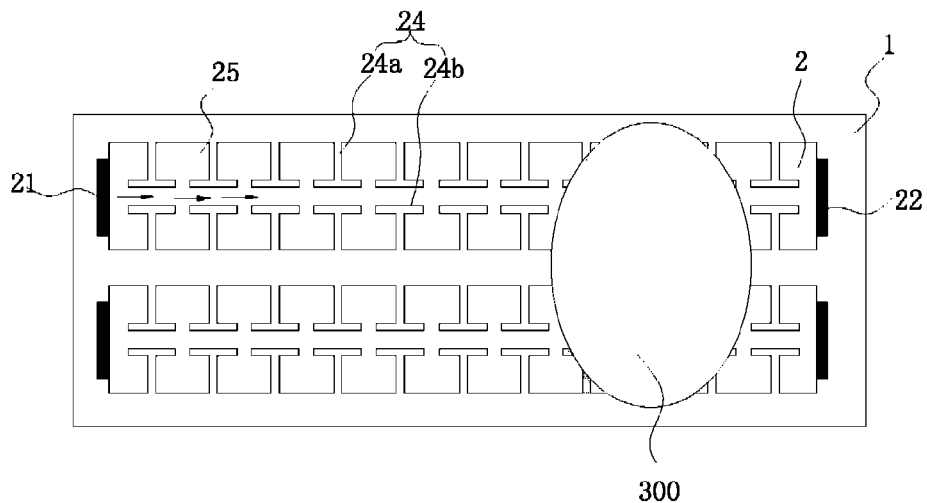

Alternatively, each empty part 24a in the first group has a substantially inverted T shape, and each empty part 24b in the second group has a substantially T shape, as shown in FIG. 13. Each substantially inverted T-shaped empty part 24a comprises a first limb substantially in a horizontal direction and a second limb substantially in a vertical direction. It would be noted by those skilled in the art that, the first limb may be deviated from the horizontal direction by a predetermined angle, and the second limb may be deviated from the vertical direction by a predetermined angle (not shown).

Figure 14:
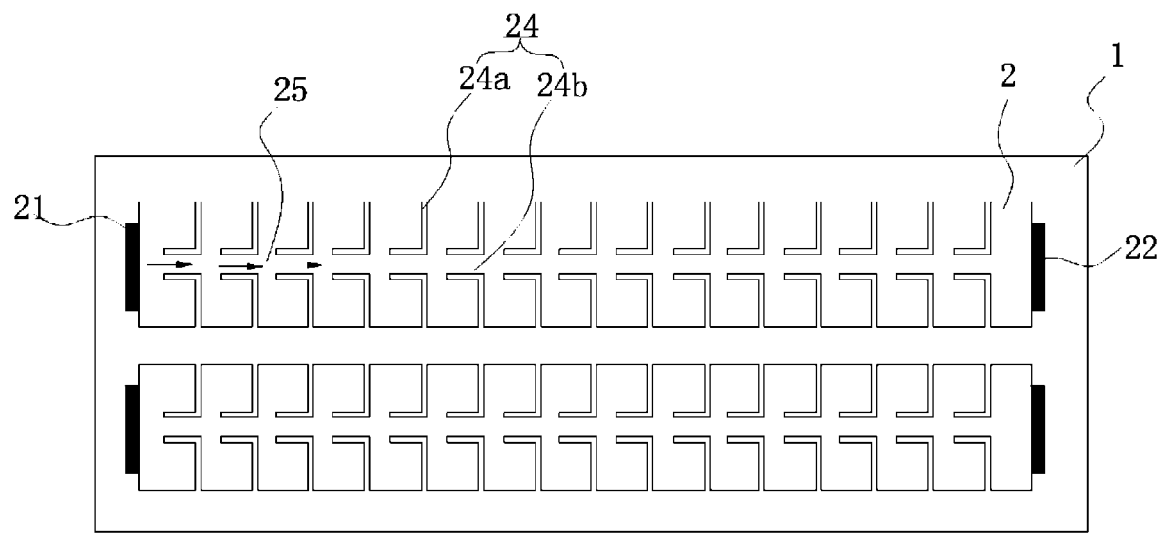

Alternatively, each empty part 24a in the first group has a substantially L shape, and each empty part 24b in the second group has a substantially inverted L shape, as shown in FIG. 14. Each substantially L-shaped empty part 24a comprises a first limb substantially in a horizontal direction and a second limb substantially in a vertical direction. It would be noted by those skilled in the art that, the first limb may be deviated from the horizontal direction by a predetermined angle, and the second limb may be deviated from the vertical direction by a predetermined angle (not shown).

Certainly, the present disclosure is not limited to this. In some examples, each empty part 24a in the first group and each empty part 24b in the second group opposite to each other may have other shapes, provided that the width of the current passage 25 in the up and down direction is reduced. As an example, each empty part 24a in the first group and each empty part 24b in the second group may each have a substantially rectangular shape, or a substantially U shape such as a U shape having a straight closed end or a U shape having an arc-shaped closed end. As another example, each empty part 24a in the first group and each empty part 24b in the second group may each have a substantially H shape or a substantially I shape, and each substantially H-shaped or I-shaped empty part comprises a first limb and a second limb which are substantially parallel to each other, and a third limb connected between the first limb and the second limb. As another example, each empty part 24a in the first group and each empty part 24b in the second group may each have other shapes (not shown).

Figure 16:
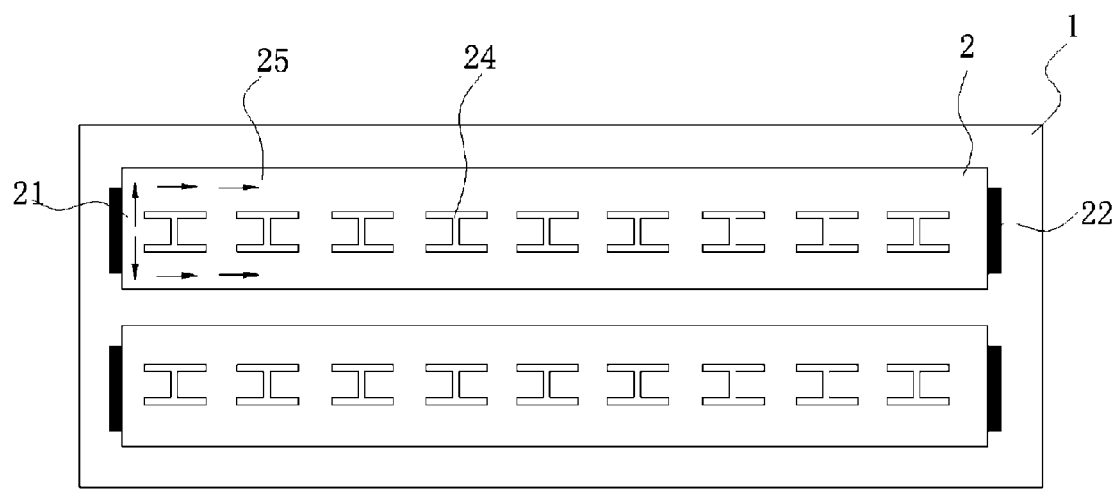
Figure 17:
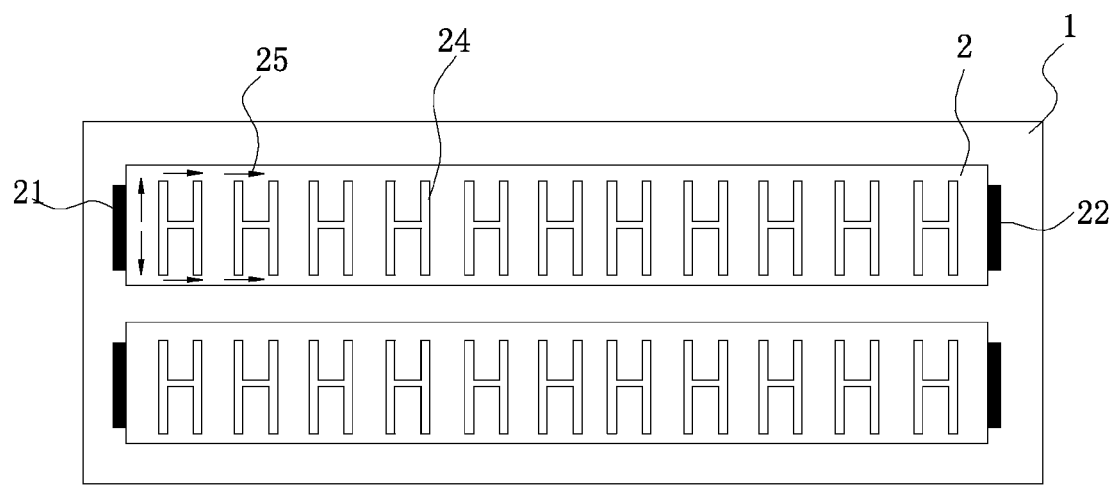

In some embodiments of the present disclosure, there are two current passages 25, one current passage 25 is adjacent to one edge of the induction body 20 extending in the extending direction of the current passage 25, and the other current passage 25 is adjacent to the other edge of the induction body 20 extending in the extending direction of the current passage 25, so that a total length of the current passage 25, i.e., a length of a current flowing path, may be increased and a width of the current passage 25 may be reduced. For example, when each current passage 25 has a rectangular shape, as shown in FIGS. 15-17, one current passage 25 is adjacent to an upper edge of the induction body 20 and extends in a left and right direction, and the other current passage 25 is adjacent to a lower edge of the induction body 20 and extends in the left and right direction.

Figure 15:
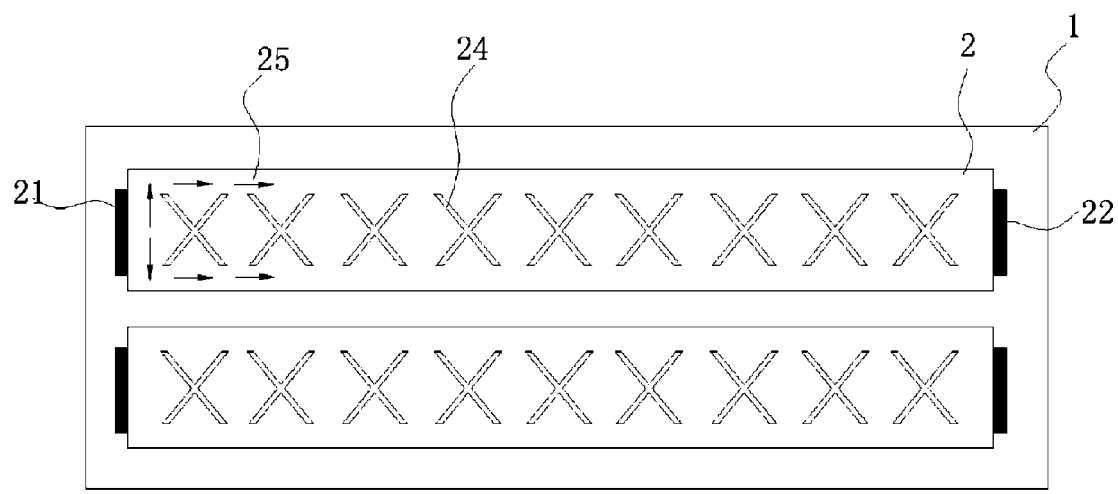

Alternatively, a plurality of empty parts 24 are linearly arranged in the extending direction, and each empty part 24 has a substantially X shape, as shown in FIG. 15. Certainly, the present disclosure is not limited to this. In some examples, the plurality of empty parts 24 linearly arranged in the extending direction may have other shapes, for example, a substantially rectangular shape, a substantially U shape (not shown), a substantially H shape (as shown in FIG. 17), a substantially I shape (as shown in FIG. 16), or a combination thereof, provided that two current passages 25 are formed on the induction body 20.

With the touch detecting assembly 100 according to an embodiment of the present disclosure, by forming the empty parts 24 in the induction body 20, the current passage 25 on the induction body 20 is made to be narrower or longer, which is equivalent to increase L or reduce h in the formula R=P*L/h and the resistor R between the first electrode 21 and the second electrode 22 becomes larger, so that a magnitude of the R needed for the detecting precision may be obtained and the linearity of the induction is improved.

With the touch detecting assembly 100 according to the above embodiment of the present disclosure, rectangular induction bodies 20 parallel to each other may be used to reduce a structure complexity of a device, thus reducing a manufacturing cost while ensuring a detecting precision.

The touch detecting assembly 100 having an L-shaped induction body 20 according to some embodiments of the present disclosure will be described below with reference to FIGS. 18-29.

The L-shaped induction body 20 has a first end (i.e., an upper end of an L shape in FIGS. 18-29) and a second end (i.e., a lower end of an L shape in FIGS. 18-29), a length direction of the L-shaped induction body 20 is a direction from the first end to the second end of the L-shaped induction body 20, a first electrode 21 is connected with the first end of the induction body 20, a second electrode 22 is connected with the second end of the induction body 20, a current passage 25 extends between the first end and the second end in a curve so that a length L of the current passage 25 in an extending direction (i.e., the length direction of the L-shaped induction body 20) of the current passage 25 is larger than a length of the induction body 20, and a current flowing direction is shown by arrows in any one of FIGS. 18-29. With the touch detecting assembly 100 according to an embodiment of the present disclosure, by forming the empty parts 24 in the induction body 20, the current passage 25 on the induction body 20 is made to be narrower or longer, which is equivalent to increase L or reduce h in the formula R=P*L/h and the resistance R between the first electrode 21 and the second electrode 22 becomes larger, so that a magnitude of the R needed for the detecting precision may be obtained and the linearity of the induction is improved.

For clarity purpose, in the following description, the fact that a first induction body part 201 of the L-shaped induction body 20 extends horizontally and a second induction body part 202 of the L-shaped induction body 20 extends vertically is described as an example, that is, an extending direction of the first induction body part 201 is a left and right direction in any one of FIGS. 18-29, and a direction orthogonal to the extending direction of the first induction body part 201 is an up and down direction in any one of FIGS. 18-29; and an extending direction of the second induction body part 202 is an up and down direction in any one of FIGS. 18-29, and a direction orthogonal to the extending direction of the second induction body part 202 is an left and right direction in any one of FIGS. 18-29.

In some embodiments of the present disclosure, the plurality of empty parts 24 are divided into a first group and a second group, empty parts 24a in the first group are linearly arranged in the extending direction, empty parts 24b in the second group are linearly arranged in the extending direction, empty parts 24a in the first group alternate with empty parts 24b in the second group one by one in the extending direction, and each empty part 24a in the first group partly overlap a corresponding empty part 24b in the second group in a direction orthogonal to the extending direction.

Figure 18:
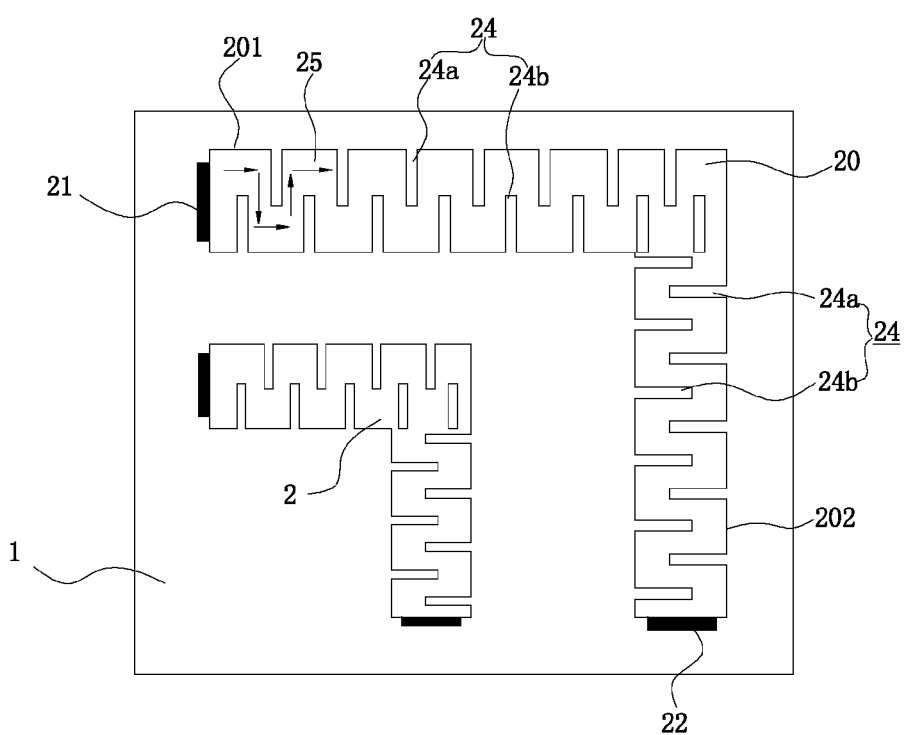
FIGS. 18-29 are schematic views showing different examples of a touch detecting assembly according to embodiments of the present disclosure, in which the induction bodies have a substantially L shape.

In a first example, each empty part 24 has a rectangular shape, as shown in FIG. 18. That is, in this example, the empty parts 24a in the first group and the empty parts 24b in the second group each have a rectangular shape, the empty parts 24a in the first group alternate with the empty parts 24b in the second group one by one in the length direction of the L-shaped induction body 20, and the empty parts 24a in the first group partly overlap a corresponding empty parts 24b in the second group in a direction orthogonal to the length direction of the L-shaped induction body 20. In other words, in the first induction body part 201, the empty parts 24a in the first group alternate with the empty parts 24b in the second group one by one in a left and right direction, and the empty parts 24a in the first group and the empty parts 24b in the second group partly overlap in an up and down direction. In the second induction body part 202, the empty parts 24a in the first group alternate with the empty parts 24b in the second group one by one in an up and down direction, and the empty parts 24a in the first group and the empty parts 24b in the second group partly overlap in a left and right direction.

In this embodiment, the phrase "partly overlap" means that:

in the first induction body part 201, adjacent empty part 24a and empty part 24b are spaced apart from each other in the left and right direction and their projections on a plane orthogonal to the left and right direction (i.e., the vertical plane) partly overlap each other, in other words, when viewed from the left and right direction, the empty parts 24a and the empty parts 24b partly overlap; and in the second induction body part 202, adjacent empty part 24a and empty part 24b are spaced apart from each other in the up and down direction and their projections on a plane orthogonal to the up and down direction (i.e., the horizontal plane) partly overlap each other, in other words, when viewed from the up and down direction, the empty parts 24a and the empty parts 24b partly overlap.

Certainly, the present disclosure is not limited to this. In other examples, each empty part 24 may also have a substantially I shape or a substantially H shape (not shown).

In some examples, each empty part 24a in the first group has a substantially inverted T shape, and each empty part 24b in the second group has a substantially T shape.

Figure 19:
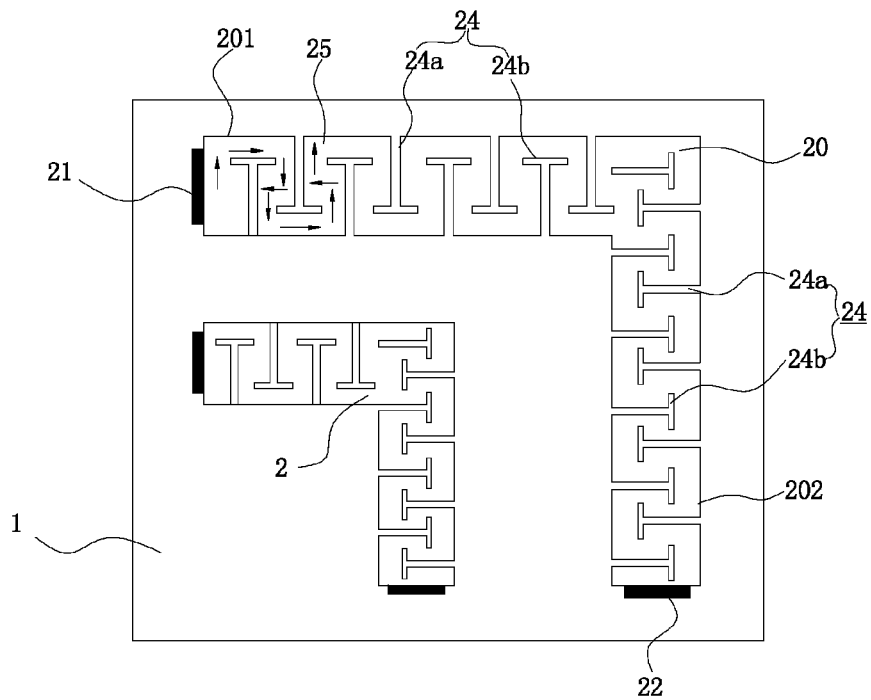

That is, as shown in FIG. 19, the substantially inverted T-shaped empty parts 24a in the first group are spaced apart from each other in the length direction of the L-shaped induction body 20, the substantially T-shaped empty parts 24b in the second group are spaced apart from each other in the length direction of the L-shaped induction body 20, the substantially T-shaped empty parts 24b in the second group alternate with the substantially inverted T-shaped empty parts 24a in the first group, and the substantially inverted T-shaped empty parts 24a in the first group and the substantially T-shaped empty parts 24b in the second group partly overlap in a direction orthogonal to the length direction of the L-shaped induction body 20. In other words, in the first induction body part 201, the empty parts 24a in the first group alternate with the empty parts 24b in the second group one by one in a left and right direction, and the empty parts 24a in the first group and the empty parts 24b in the second group partly overlap in an up and down direction. In some embodiments, an upper end of each empty part 24a in the first group is connected with an upper edge of the first induction body part 201, and a lower end of each empty part 24b in the second group is connected with a lower edge of the first induction body part 201. In the second induction body part 202, the empty parts 24a in the first group alternate with the empty parts 24b in the second group one by one in an up and down direction, and the empty parts 24a in the first group and the empty parts 24b in the second group partly overlap in a left and right direction. In some embodiments, a right end of each empty part 24a in the first group is connected with a right edge of the second induction body part 202, and a left end of each empty part 24b in the second group is connected with a left edge of the second induction body part 202.

Therefore, when a control chip 200 applies a level signal to each first electrode 21 and/or each second electrode 22 to generate a current flowing in a direction as shown by arrows in FIG. 19, the current flows in a curve, so that a path of the current passage 25 may become longer. Therefore, L in the formula of R=P*L/h may be increased, so that a resistance R between each first electrode 21 and each second electrode 22 may become larger.

Figure 20:
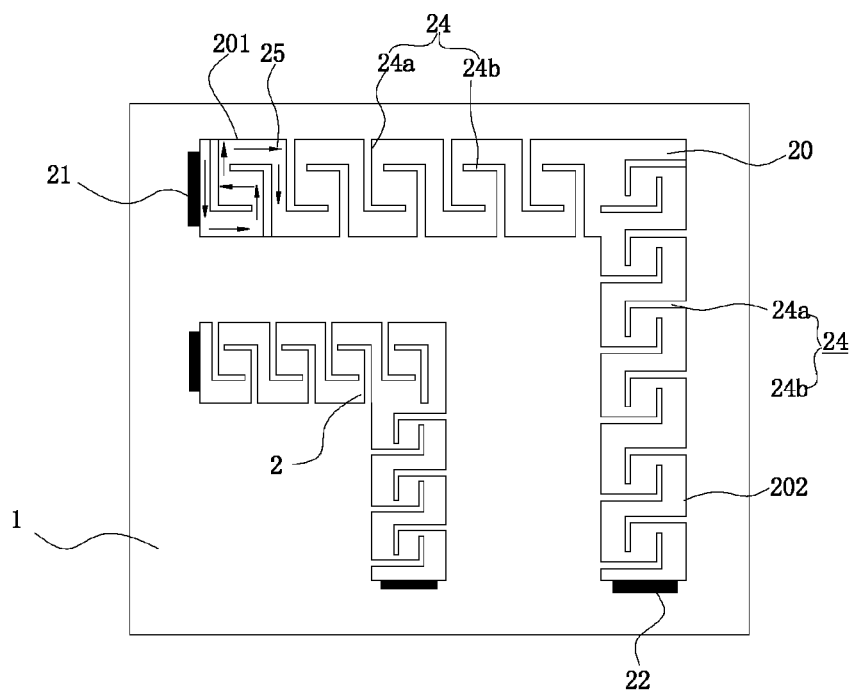

In other examples, each empty part 24a in the first group has a substantially L shape, each empty part 24b in the second group has a substantially 7 shape, the empty parts 24a in the first group and the empty parts 24b in the second group form a plurality of pairs of L-7 empty parts, and a substantially L-shaped empty part 24a and a substantially 7-shaped empty part 24b in each pair are opposite to each other, cross each other in the extending direction and partly overlap with each other in a direction orthogonal to the extending direction. That is, as shown in FIG. 20, the substantially L-shaped empty parts 24a in the first group are spaced apart from each other in the length direction of the L-shaped induction body 20, and the substantially 7-shaped empty parts 24b in the second group are spaced apart from each other in the length direction of the L-shaped induction body 20. The substantially L-shaped empty parts 24a in the first group and the substantially 7-shaped empty parts 24b in the second group cross each other, and the empty part 24a and the empty part 24b in each pair are opposite to each other and partly overlap. In other words, in the first induction body part 201, the empty parts 24a in the first group cross the empty parts 24b in the second group in a left and right direction, and the empty parts 24a in the first group and the empty parts 24b in the second group partly overlap in an up and down direction. In some embodiments, an upper end of each empty part 24a in the first group is connected with an upper edge of the first induction body part 201, and a lower end of each empty part 24b in the second group is connected with a lower edge of the first induction body part 201.

In the second induction body part 202, the empty parts 24a in the first group cross the empty parts 24b in the second group in an up and down direction, and the empty parts 24a in the first group and the empty parts 24b in the second group partly overlap in a left and right direction. In some embodiments, a right end of each empty part 24a in the first group is connected with a right edge of the second induction body part 202, and a left end of each empty part 24b in the second group is connected with a left edge of the second induction body part 202.

In this embodiment, the phrase "partly overlap" means that: in the first induction body part 201, the first limbs (i.e., vertical limbs in FIG. 20) of the empty part 24a and the empty part 24b in each pair are spaced apart from each other in the left and right direction and their projections on a plane orthogonal to the left and right direction (i.e., the vertical plane) partly overlap each other; and in the second induction body part 202, the first limbs (i.e., horizontal limbs in FIG. 20) of the empty part 24a and the empty part 24b in each pair are spaced apart from each other in the up and down direction and their projections on a plane orthogonal to the up and down direction (i.e., the horizontal plane) partly overlap each other.

In this embodiment, the phrase "cross" means that: in the first induction body part 201, the second limbs (i.e., horizontal limbs) of the empty part 24a and the empty part 24b in each pair are spaced apart from each other in the up and down direction and their projections on a plane orthogonal to the up and down direction (i.e., the horizontal plane) partly overlap each other; and in the second induction body part 202, the second limbs (i.e., vertical limbs) of the empty part 24a and the empty part 24b in each pair are spaced apart from each other in the left and right direction and their projections on a plane orthogonal to the left and right direction (i.e., the vertical plane) partly overlap each other.

Therefore, when a control chip 200 applies a level signal to each first electrode 21 and/or each second electrode 22 to generate a current flowing in a direction as shown by arrows in FIG. 20, the current flows in a curve, so that a path of the current passage 25 may become longer. Therefore, L in the formula of R=P*L/h may be increased, so that a resistance R between each first electrode 21 and each second electrode 22 may become larger.

Figure 21:
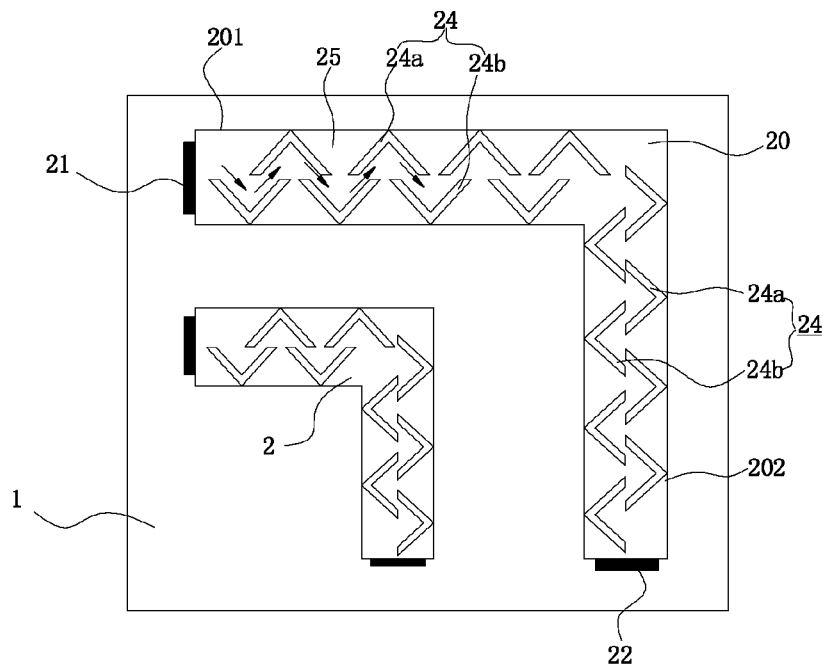

In other examples, each empty part 24a in the first group has a substantially inverted V shape, each empty part 24b in the second group has a substantially V shape, and each empty part 24a in the first group crosses two adjacent limbs of two adjacent empty parts 24b in the second group in the extending direction. That is, as shown in FIG. 21, in the first induction body part 201, the substantially inverted V-shaped empty parts 24a in the first group are spaced apart from each other in a left and right direction, the substantially V-shaped empty parts 24b in the second group are spaced apart from each other in the left and right direction, and the substantially inverted V-shaped empty parts 24a in the first group alternate with the substantially V-shaped empty parts 24b in the second group, so that each empty part 24a in the first group crosses two adjacent limbs of two adjacent empty parts 24b in the second group below the each empty part 24a in the first group in the left and right direction. In the second induction body part 202, the substantially inverted V-shaped empty parts 24a in the first group are spaced apart from each other in an up and down direction, the substantially V-shaped empty parts 24b in the second group are spaced apart from each other in the up and down direction, and the substantially inverted V-shaped empty parts 24a in the first group alternate with the substantially V-shaped empty parts 24b in the second group, so that each empty part 24a in the first group crosses two adjacent limbs of two adjacent empty parts 24b in the second group on the left of the each empty part 24a in the first group in the up and down direction.

Therefore, when a control chip 200 applies a level signal to each first electrode 21 and/or each second electrode 22 to generate a current flowing in a direction as shown by arrows in FIG. 21, the current flows in a curve, so that a path of the current passage 25 may become longer. Therefore, L in the formula of $R=P*L/h$ may be increased, so that a resistance R between each first electrode 21 and each second electrode 22 may become larger.

In other examples, each empty part 24a in the first group has a substantially F shape, each empty part 24b in the second group has a substantially inverted F shape, empty parts 24a in the first group and empty parts 24b in the second group form a plurality of pairs of F-inverted-F empty parts, and a substantially F-shaped empty part 24a and a substantially inverted F-shaped empty part 24b in each pair cross each other in the extending direction and partly overlap with each other in a direction orthogonal to the extending direction.

Figure 22:
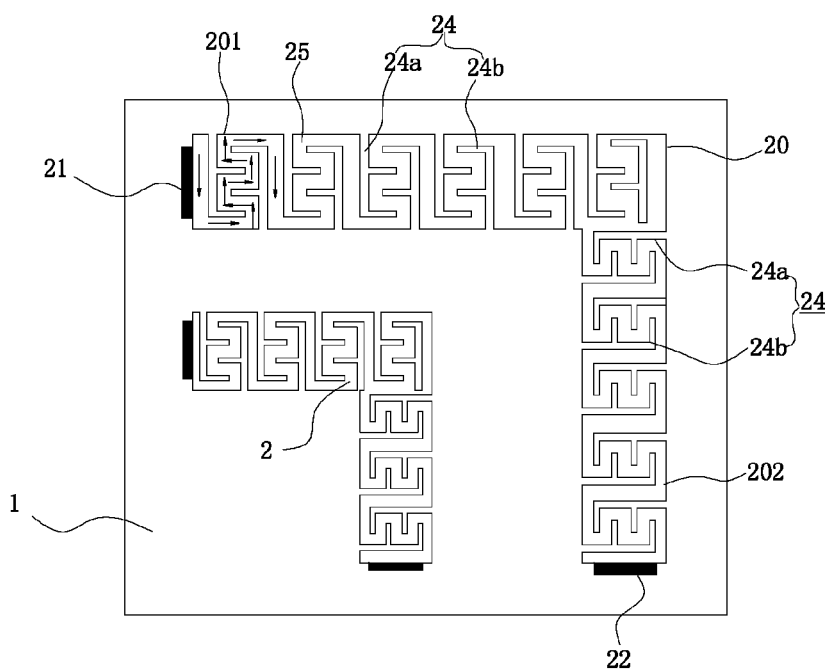

That is, as shown in FIG. 22, the substantially F-shaped empty parts 24a in the first group are spaced apart from each other in the length direction of the L-shaped induction body 20, the substantially inverted F-shaped empty parts 24b in the second group are spaced apart from each other in the length direction of the L-shaped induction body 20, the substantially F-shaped empty parts 24a in the first group alternate with the substantially inverted F-shaped empty parts 24b in the second group to form the plurality of pairs of F-inverted-F empty parts, and the empty part 24a and the empty part 24b in each pair are opposite to each other and partly overlap in a direction orthogonal to the length direction of the L-shaped induction body 20.

In other words, in the first induction body part 201, the empty parts 24a in the first group cross the empty parts 24b in the second group in a left and right direction, and the empty parts 24a in the first group and the empty parts 24b in the second group partly overlap in an up and down direction. In some embodiments, an upper end of each empty part 24a in the first group is connected with an upper edge of the first induction body part 201, and a lower end of each empty part 24b in the second group is connected with a lower edge of the first induction body part 201.

In the second induction body part 202, the empty parts 24a in the first group cross the empty parts 24b in the second group in an up and down direction, and the empty parts 24a in the first group and the empty parts 24b in the second group partly overlap in a left and right direction. In some embodiments, a right end of each empty part 24a in the first group is connected with a right edge of the second induction body part 202, and a left end of each empty part 24b in the second group is connected with a left edge of the second induction body part 202.

In this embodiment, the phrase "partly overlap" means that: in the first induction body 201, the first limbs (i.e., vertical limbs in FIG. 22) of the empty part 24a and the empty part 24b in each pair are spaced apart from each other in the left and right direction and their projections on a plane orthogonal to the left and right direction (i.e., the vertical plane) partly overlap each other; and in the second induction body 202, the first limbs (i.e., horizontal limbs in FIG. 22) of the empty part 24a and the empty part 24b in each pair are spaced apart from each other in the up and down direction and their projections on a plane orthogonal to the up and down direction (i.e., the horizontal plane) partly overlap each other.

In addition, the term "cross" means that:

in the first induction body 201, the second limbs (i.e., horizontal limbs) of the empty part 24a and the empty part 24b in each pair are spaced apart from and alternated with each other in the up and down direction and their projections on a plane orthogonal to the up and down direction (i.e., the horizontal plane) partly overlap each other, in other words, for each pair of the empty part 24a and the empty part 24b, each short limb of the empty part 24a is partly inserted into adjacent short limbs of the empty part 24b; and in the second induction body 202, the second limbs (i.e., vertical limbs) of the empty part 24a and the empty part 24b in each pair are spaced apart from and alternated with each other in the left and right direction and their projections on a plane orthogonal to the left and right direction (i.e., the vertical plane) partly overlap each other, in other words, for each pair of the empty part 24a and the empty part 24b, each short limb of the empty part 24a is partly inserted into adjacent short limbs of the empty part 24b.

Therefore, when a control chip 200 applies a level signal to each first electrode 21 and/or each second electrode 22 to generate a current flowing in a direction as shown by arrows in FIG. 22, the current flows in a curve, so that a path of the current passage 25 may become longer. Therefore, L in the formula of $R=P*L/h$ may be increased, so that a resistance R between each first electrode 21 and each second electrode 22 may become larger.

In some embodiments of the present disclosure, each induction body 20 has a first end and a second end, a first electrode 21 is connected with the first end of the induction body 20, a second electrode 22 is connected with the second end of the induction body 20, and a current passage 25 extends between the first end and the second end of the induction body 20 in a curve, so that a length L of the current passage 25 in an extending direction of the current passage 25 is larger than a length of the induction body 20. The current passage 25 extends between the first end and the second end of the induction body 20, and a cross-sectional area of the current passage 25 in a plane orthogonal to the extending direction of the current passage 25 is smaller than that of the induction body 20 in the plane. In other words, on the first induction body part 201, a width h of the current passage 25 in an up and down direction is smaller than a width of the induction body 20; and on the second induction body part 202, a width h of the current passage 25 in a left and right direction is smaller than a width of the induction body 20.

With the touch detecting assembly 100 according to an embodiment of the present disclosure, by forming the empty parts 24 in the induction body 20, the current passage 25 on the induction body 20 is made to be narrower or longer, which is equivalent to increase L or reduce h in the formula R=P*L/h and the resistance R between the first electrode 21 and the second electrode 22 becomes larger, so that a magnitude of the R needed for the detecting precision may be obtained and the linearity of the induction is improved.

Figure 23:
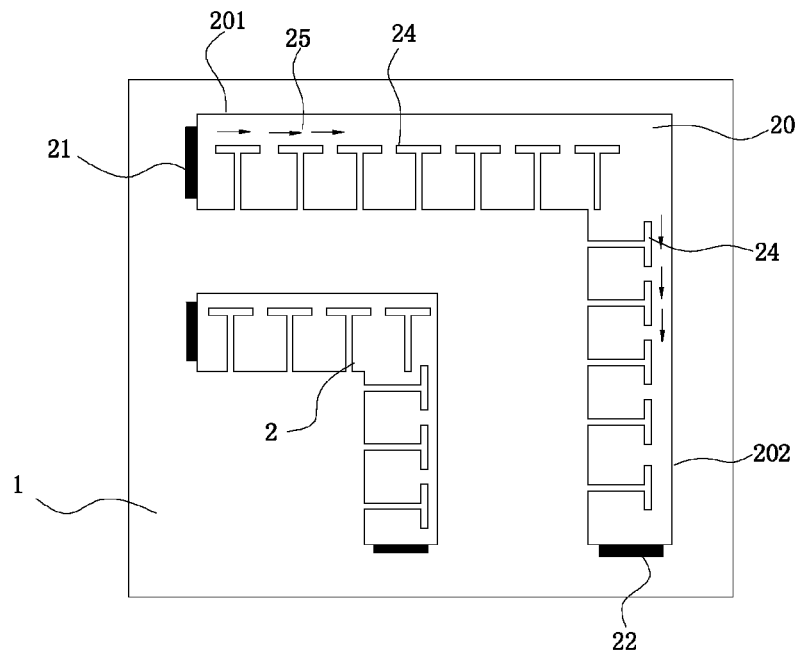
Figure 24:
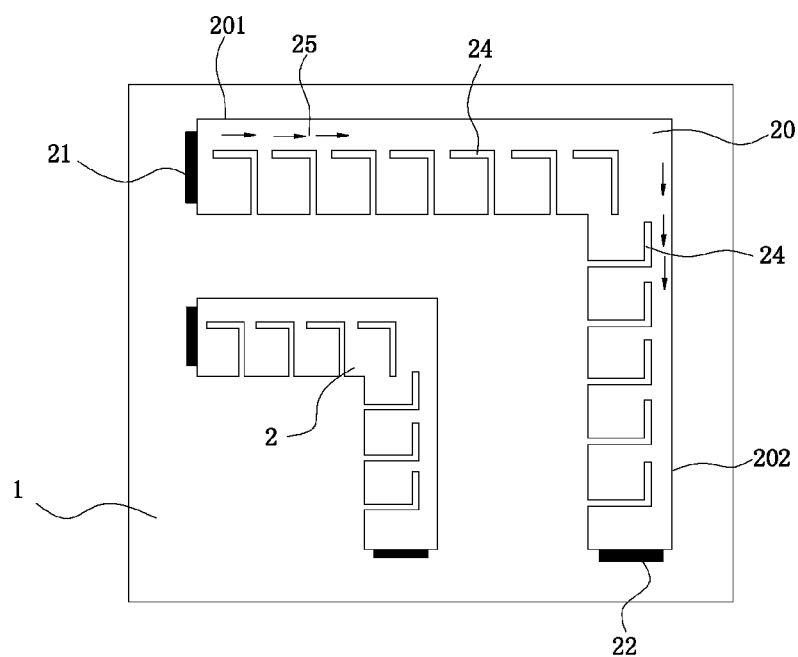

In one example, the current passage 25 is adjacent to one edge of the induction body 20 extending in the extending direction of the current passage 25. Alternatively, as shown in FIGS. 23-24, each empty part 24 has a substantially T shape or a substantially L shape. Certainly, the present disclosure is not limited to this. Each empty part 24 may also have other shapes such as a substantially rectangular shape, a substantially U shape, a substantially H shape, or a substantially I shape (not shown). Alternatively, on the first induction body part 201, the current passage 25 is adjacent to an upper edge of the induction body 20 and extends in a left and right direction; on the second induction body part 202, the current passage 25 is adjacent to a right edge of the induction body 20 and extends in an up and down direction; and a current flowing direction is shown by arrows in FIG. 23 or 24. Certainly, the present disclosure is not limited to this. In another example, on the first induction body part 201, the current passage 25 may be adjacent to a lower edge of the induction body 20 and may extend in the left and right direction; and on the second induction body part 202, the current passage 25 is adjacent to a left edge of the induction body 20 and extends in an up and down direction (not shown).

In another example, the current passage 25 is adjacent to a central line of the induction body 20 extending in the extending direction of the current passage 25 (i.e., the length direction of the induction body 20). The plurality of empty parts 24 are divided into a first group and a second group, empty parts 24a in the first group are linearly arranged in the extending direction, empty parts 24b in the second group are linearly arranged in the extending direction, empty parts 24a in the first group and empty parts 24b in the second group form a plurality of pairs of empty parts, an empty part 24a in the first group and an empty part 24b in the second group in each pair are opposite to each other in a direction orthogonal to the extending direction of the current passage 25, and the current passage 25 is defined between the empty part 24a in the first group and the empty part 24b in the second group in each pair.

In some embodiments, in the first induction body part 201, an upper end of each empty part 24a in the first group is connected with the upper edge of the induction body 20, and a lower end of each empty part 24b in the second group is connected with the lower edge of the induction body 20; and in the second induction body part 202, a right end of each empty part 24a in the first group is connected with a right edge of the second induction body part 202, and a left end of each empty part 24b in the second group is connected with the left edge of the second induction body part 202. When a control chip 200 applies a level signal to each first electrode 21 and/or each second electrode 22 to generate a current flowing in a direction as shown by arrows in FIG. 25 or 26, the current flows in a curve, so that a width of the current passage 25 in an up and down direction may be reduced. That is, h in the formula of R=P*L/h may be reduced, so that a resistance R between each first electrode 21 and each second electrode 22 may become larger.

Figure 25:
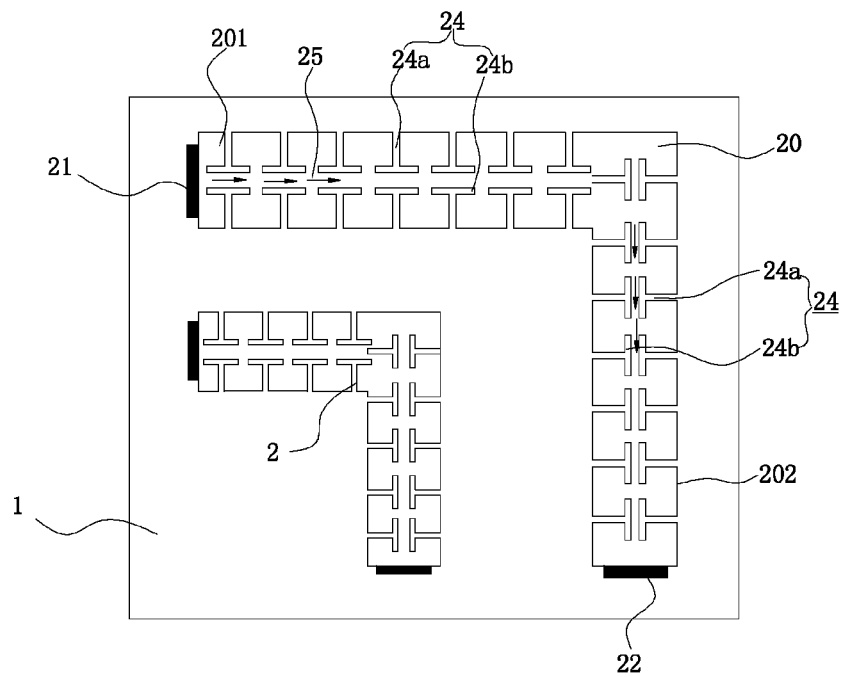
Figure 26:
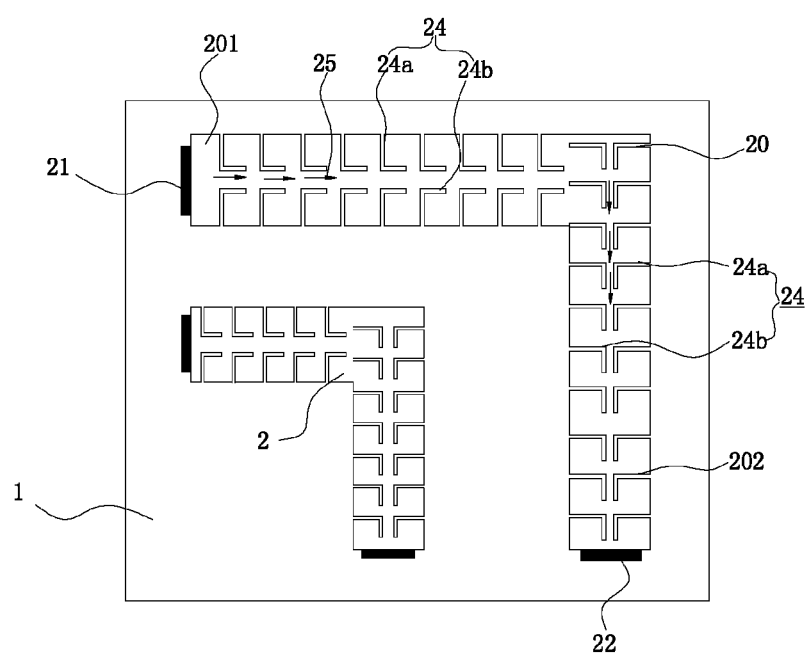

Alternatively, each empty part 24a in the first group has a substantially inverted T shape, and each empty part 24b in the second group has a substantially T shape, as shown in FIG. 25. Alternatively, each empty part 24a in the first group has a substantially L shape, and each empty part 24b in the second group has a substantially inverted L shape, as shown in FIG. 26. Certainly, the present disclosure is not limited to this.

In some examples, each empty part 24a in the first group and each empty part 24b in the second group opposite to each other may have other shapes such as a substantially rectangular shape, a substantially U shape, a substantially H shape, or a substantially I shape (not shown), provided that the width of the current passage 25 in the up and down direction and/or the left and right direction is reduced.

Figure 27:
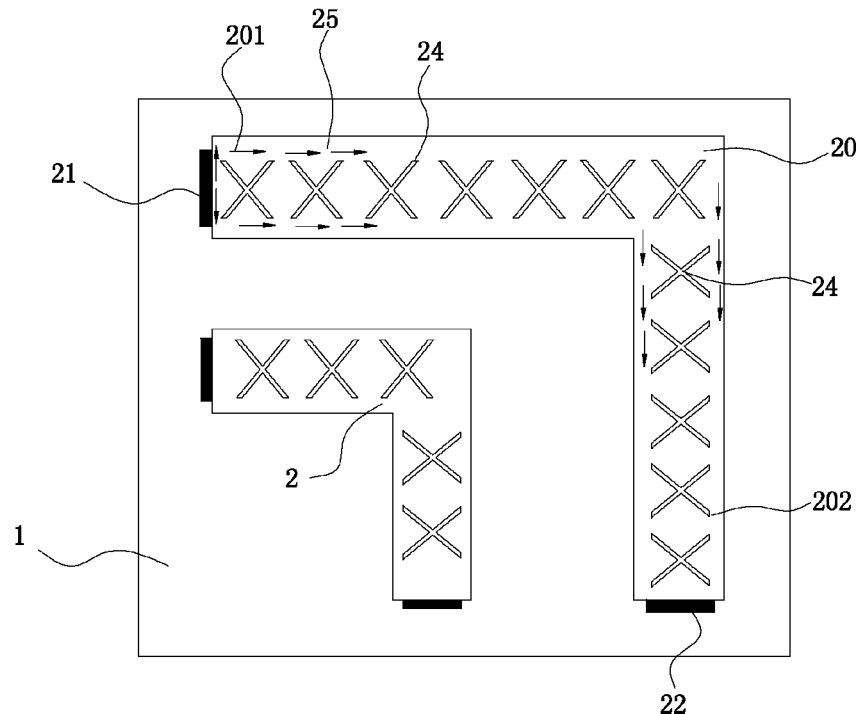
Figure 28:
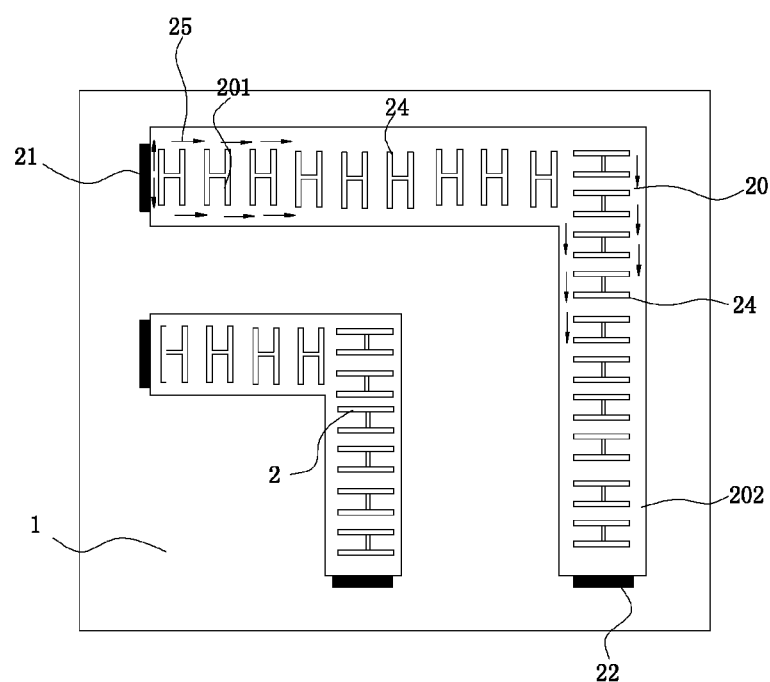
Figure 29:
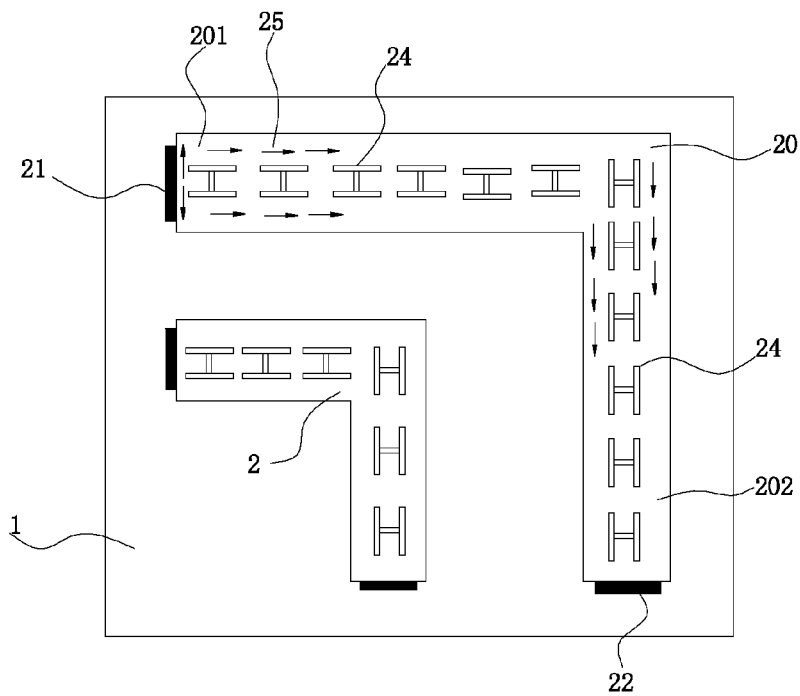
Figure 30:
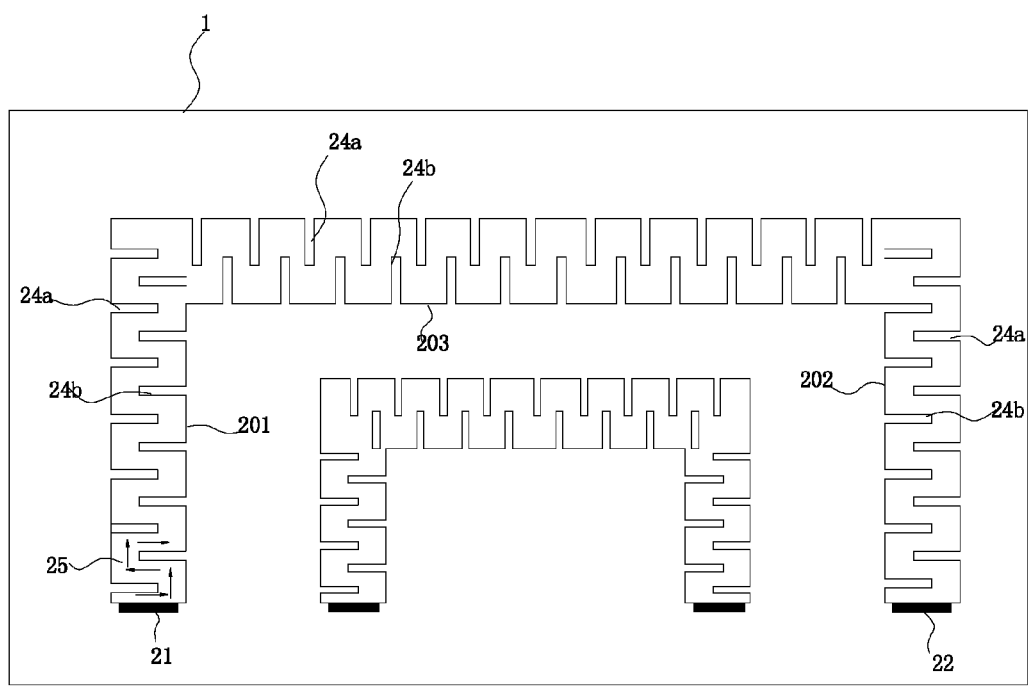
FIGS. 30-41 are schematic views showing different examples of a touch detecting assembly according to embodiments of the present disclosure, in which the induction bodies have a substantially U shape.
Figure 31:
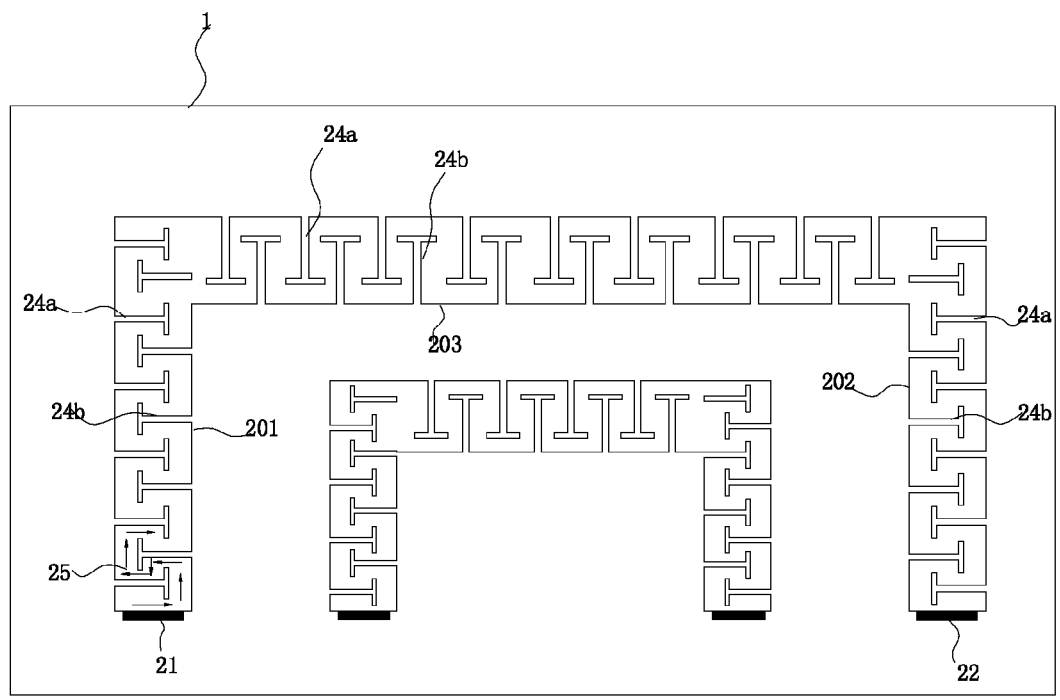
Figure 32:
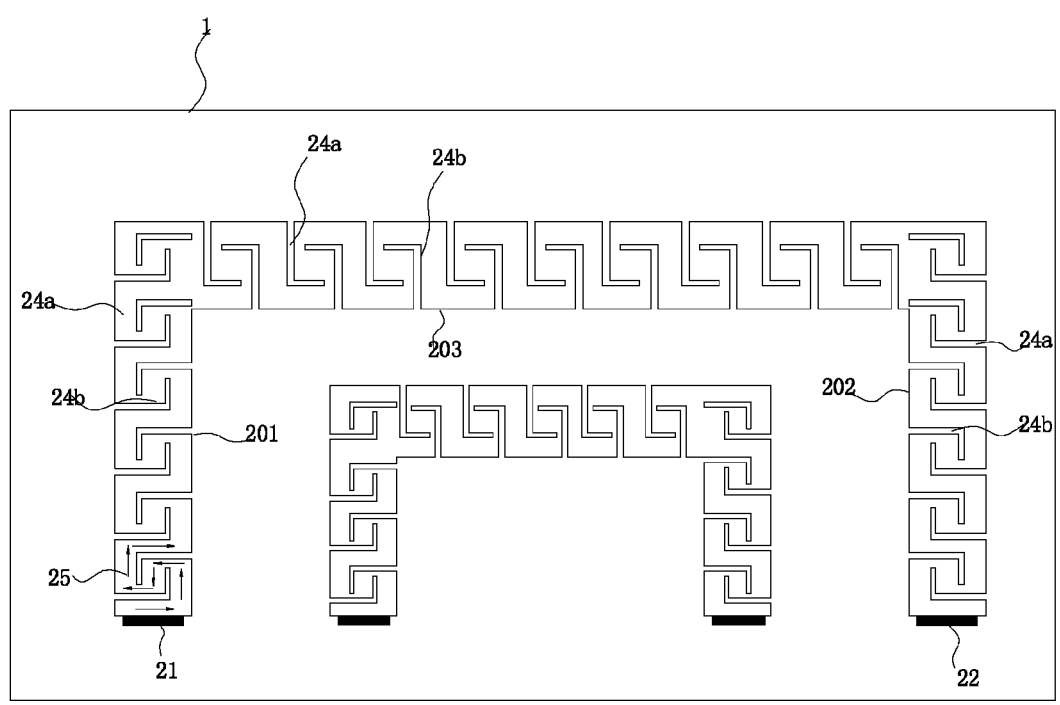
Figure 33:
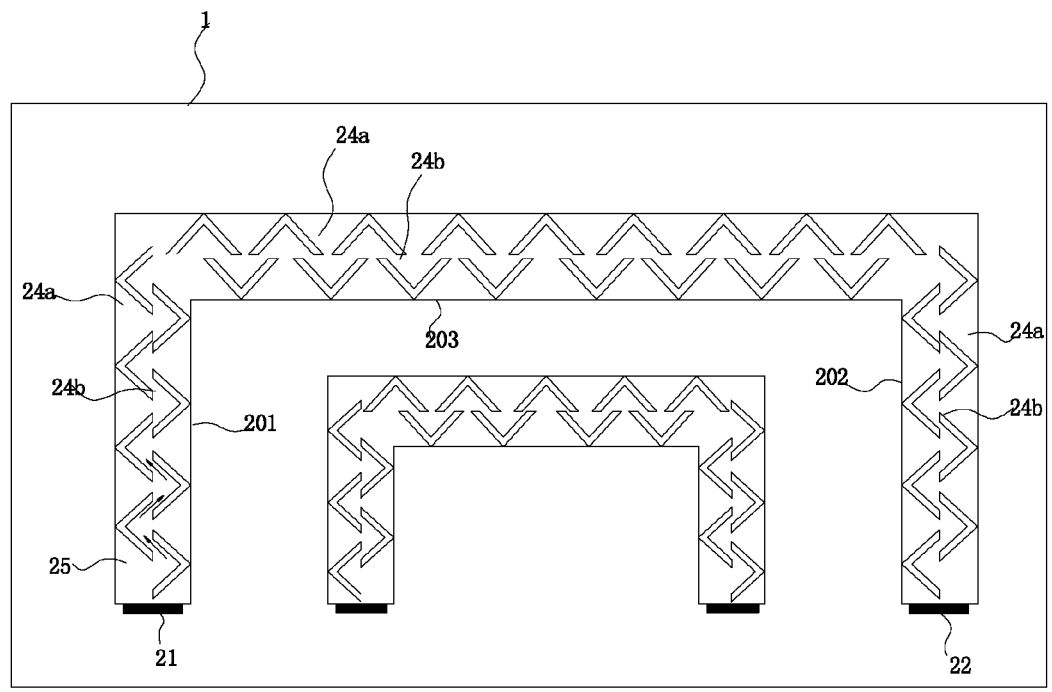
Figure 34:
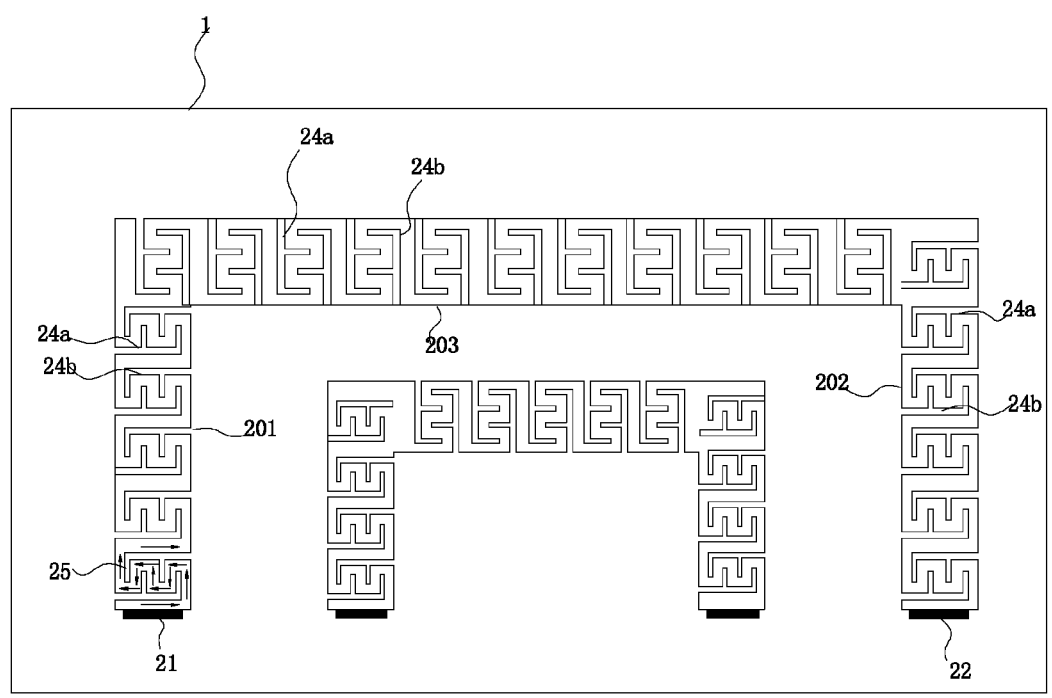
Figure 35:
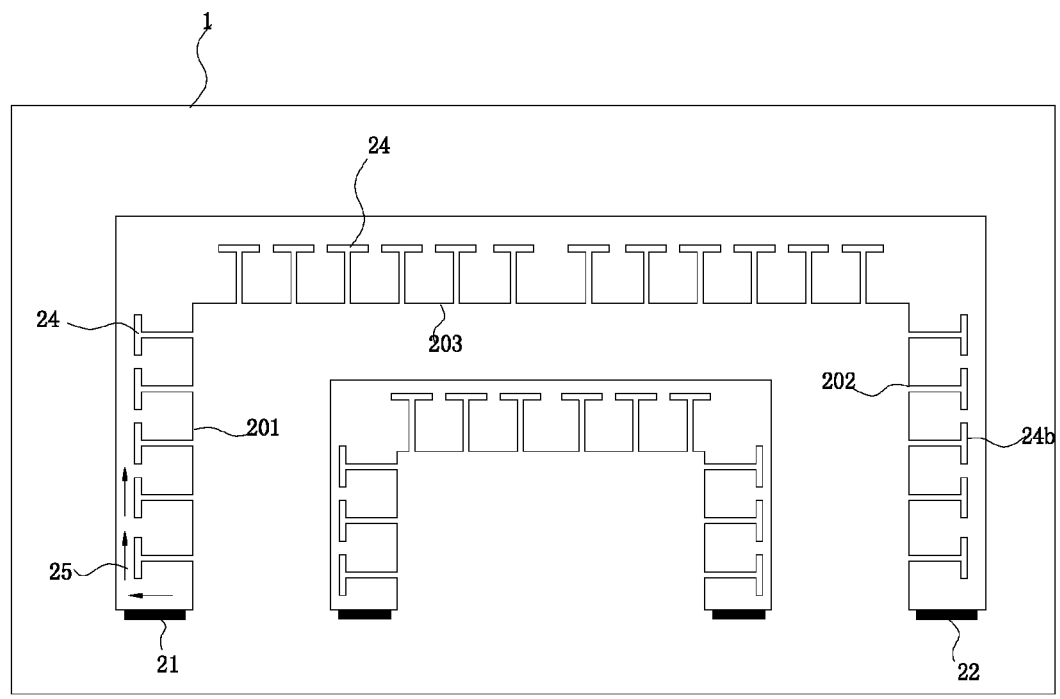
Figure 36:
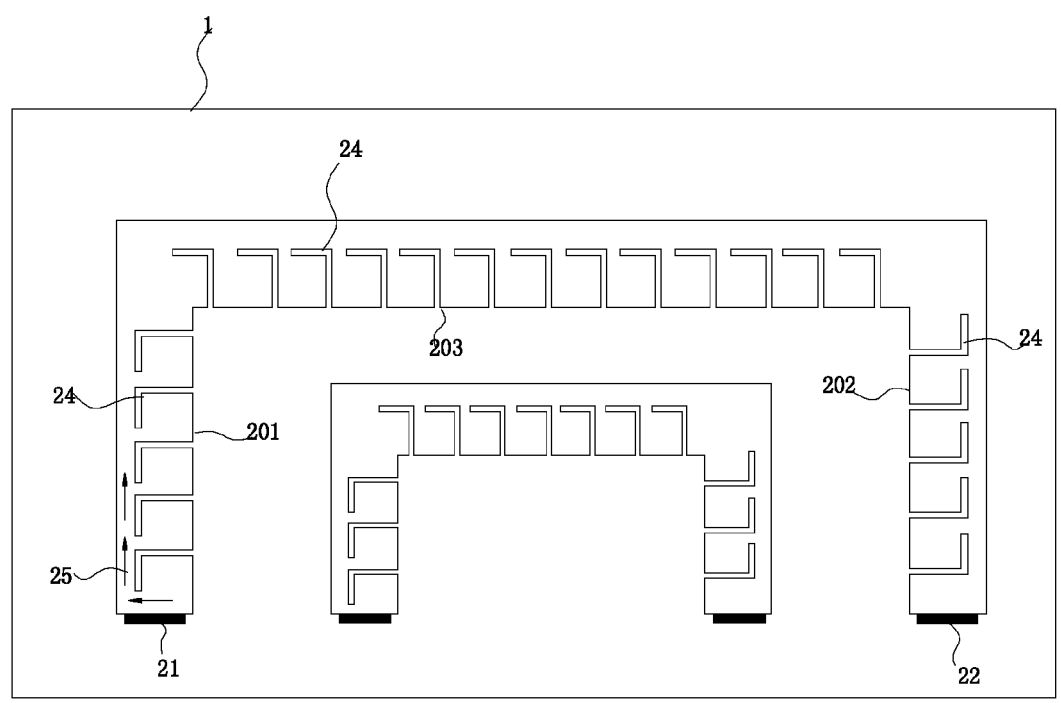
Figure 37:
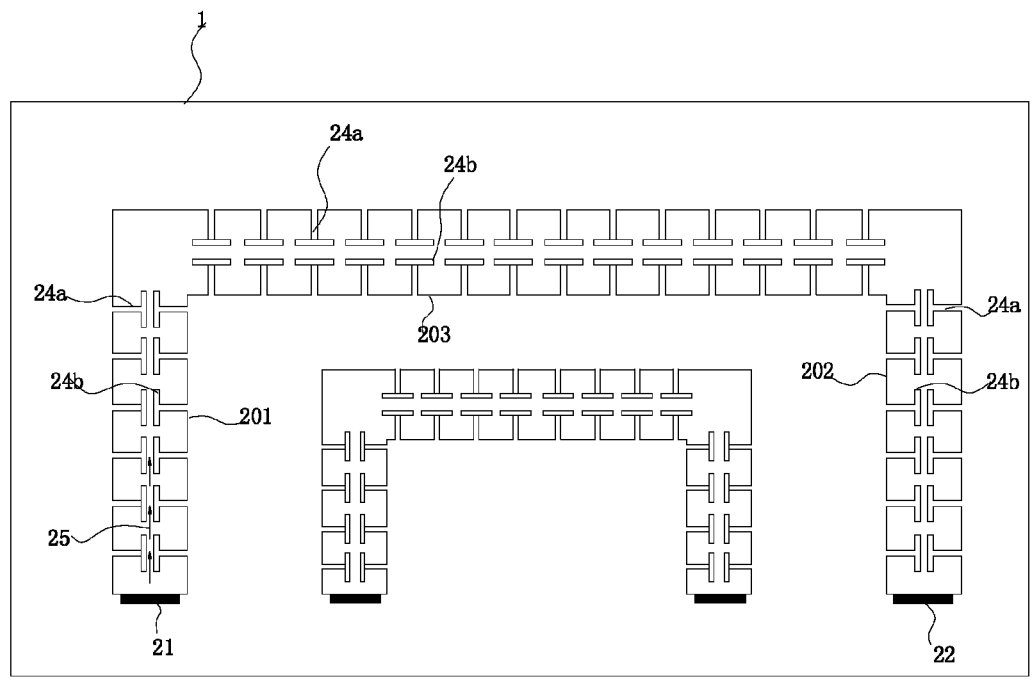
Figure 38:
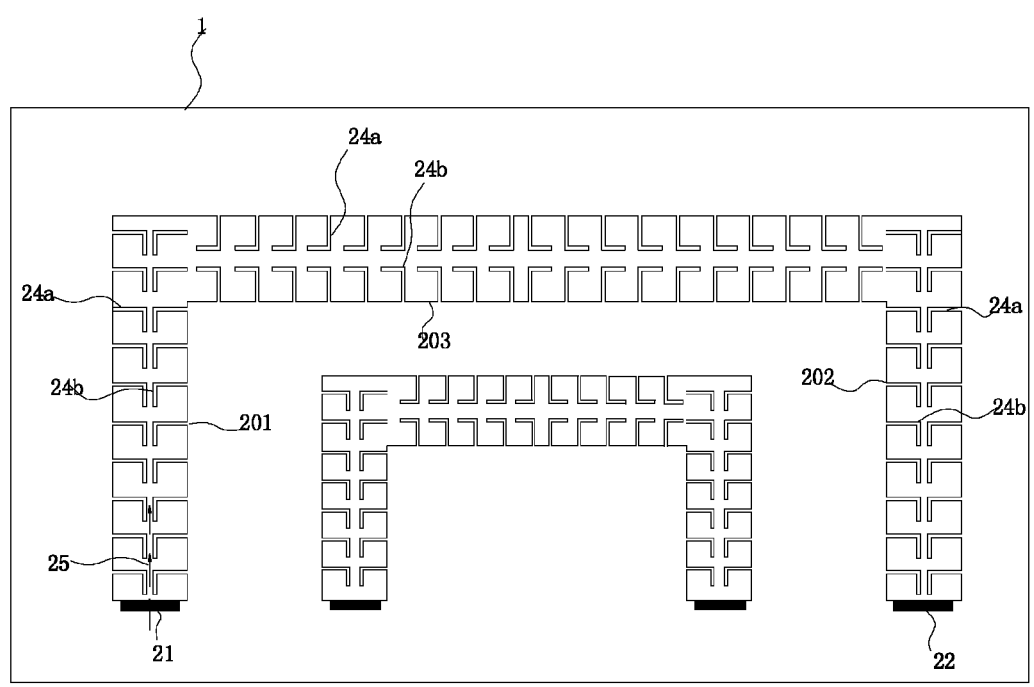

In some embodiments of the present disclosure, there are two current passages 25, one current passage 25 is adjacent to one edge of the induction body 20 extending in the extending direction of the current passage 25, and the other current passage 25 is adjacent to the other edge of the induction body 20 extending in the extending direction of the current passage 25. As shown in FIGS. 27-29, on the first induction body part 201, one current passage 25 is adjacent to an upper edge of the first induction body part 201 and extends in a left and right direction, and the other current passage 25 is adjacent to a lower edge of the first induction body part 201 and extends in the left and right direction. On the second induction body part 202, one current passage 25 is adjacent to a right edge of the second induction body part 202 and extends in an up and down direction, and the other current passage 25 is adjacent to a left edge of the induction body part 201 and extends in the up and down direction.

Alternatively, a plurality of empty parts 24 are linearly arranged in the extending direction, and each empty part 24 has a substantially X shape, as shown in FIG. 27. Certainly, the present disclosure is not limited to this. In some examples, the plurality of empty parts 24 linearly arranged in the extending direction may have other shapes such as a substantially rectangular shape, a substantially U shape (not shown), a substantially H shape (as shown in FIG. 28), a substantially I shape (as shown in FIG. 29), or a combination thereof, provided that two current passages 25 are formed on the induction body 20.

With the touch detecting assembly 100 according to an embodiment of the present disclosure, by disposing the empty parts 24 on the induction body 20, the current passage 25 on the induction body 20 is made to be narrower or longer, which is equivalent to increase L or reduce h in the formula R=P*L/h and the resistor R between the first electrode 21 and the second electrode 22 becomes larger, so that a magnitude of the R needed for the detecting precision may be obtained and the linearity of the induction is improved.

With the touch detecting assembly 100 according to the above embodiment of the present disclosure, L-shaped induction bodies 20 are used, which may effectively reduce the noise and improve the induction linearity. The touch detecting assembly 100 has a simple structure, thus reducing a manufacturing cost.

The touch detecting assembly 100 having a rectangular-shaped or L-shaped induction body 20 according to an embodiment of the present disclosure is described above with reference to FIGS. 6-29. However, those skilled in the art may obviously understand that this technical solution may be applied to other technical solutions in which the induction body 20 has other shapes such as a U-shape. Therefore, the touch detecting assembly 100 with a substantially U-shaped induction body 20 will not be described in detail here.

It should be noted that with reference to FIGS. 30-41, the substantially U-shaped induction body 20 comprises a first induction body part 201, a second induction body part 202 and a third induction body part 203. The first induction body part 201, the second induction body part 202 and the third induction body part 203 may all have a rectangular shape. In order to describe more clearly, an example in which the first induction body part 201 and the second induction body part 202 extend vertically while the third induction body part 203 extends horizontally is described. The first induction body part 201 and the second induction body part 202 extend in an up and down direction in FIGS. 30-41 and a direction orthogonal to the up and down direction is a left and right direction; and the third induction body part 203 extends in a left and right direction in FIGS. 30-41 and a direction orthogonal to the left and right direction is an up and down direction.

In FIGS. 30-34, the current passage 25 extends between a first end and a second end of the substantially U-shaped induction body 20 in a curve, so that a length L of the current passage 25 in an extending direction of the current passage 25 is larger than a length of the induction body 20. Thus, L is increased in the formula R=P*L/h and the resistor R between the first electrode 21 and the second electrode 22 becomes larger, so that the linearity of the induction is improved.

In FIGS. 35-38, because the current passage 25 extends between a first end and a second end in a curve, a length L of the current passage 25 in an extending direction of the current passage 25 is larger than a length of the induction body 20, and a cross-sectional area of the current passage 25 in a plane orthogonal to an extending direction of the current passage 25 is smaller than that of the induction body 20 in the plane, so that the current passage 25 is made to be longer and narrower. Thus, L is increased and h is reduced in the formula R=P*L/h and the resistor R between the first electrode 21 and the second electrode 22 becomes larger, so that the linearity of the induction is improved.

Figure 39:
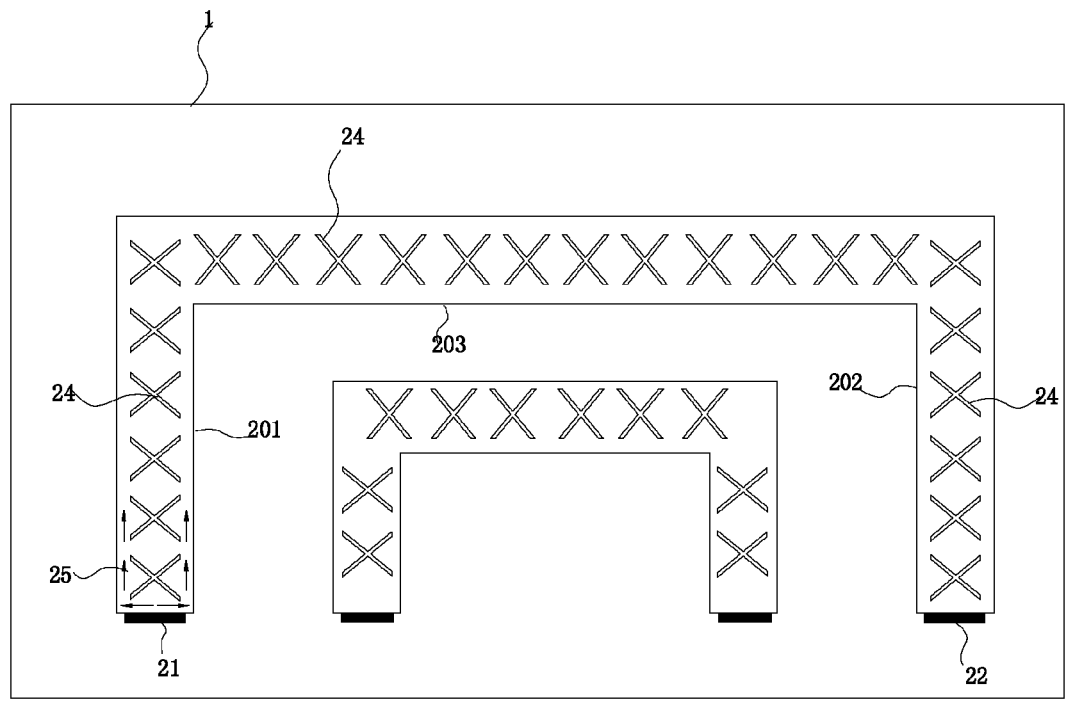
Figure 40:
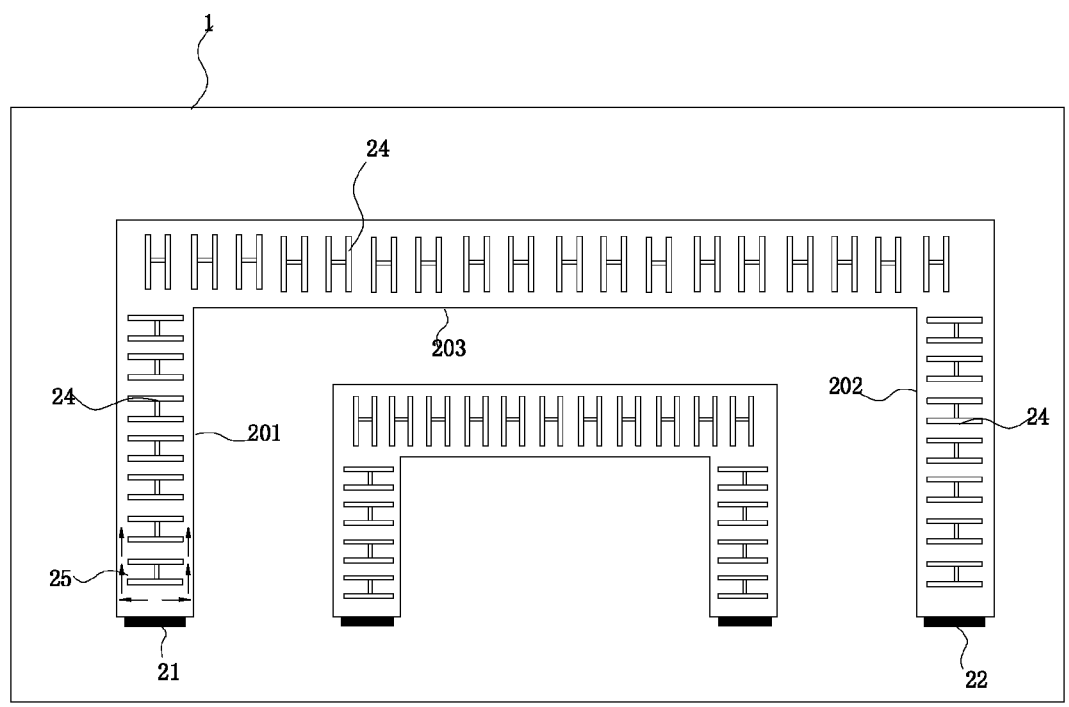
Figure 41:
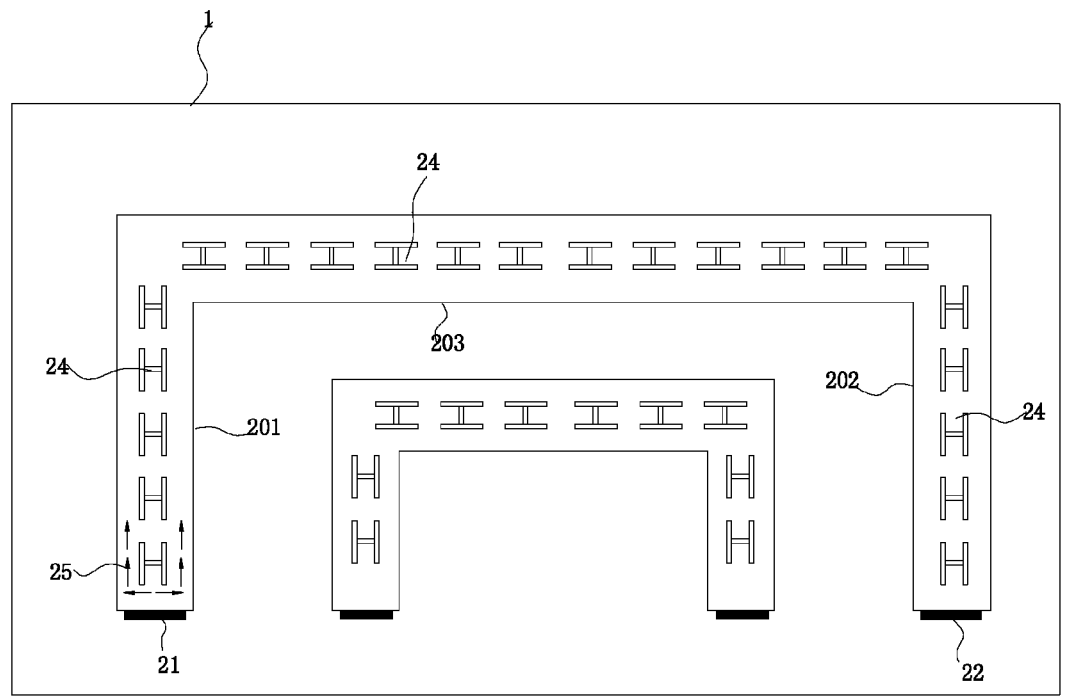

FIGS. 39-41 show two current passages 25, one current passage 25 is adjacent to one edge of the induction body 20 extending in the extending direction of the current passage 25, and the other current passage 25 is adjacent to the other edge of the induction body 20 extending in the extending direction of the current passage 25. Thus, the current passage 25 is made to be longer and narrower, which is equivalent to increase L and reduce h in the formula R=P*L/h and the resistor R between the first electrode 21 and the second electrode 22 becomes larger, so that a magnitude of the R needed for the detecting precision may be obtained and the linearity of the induction is improved.

With the substantial U-shaped induction body 20 in the touch detecting assembly 100 according to the above embodiment of the present disclosure, a structure complexity of a device may be reduced and the device is easy to manufacture. All the electrodes are located at the same side, which are easy to manufacture, thus reducing a manufacturing cost.

Figure 42:
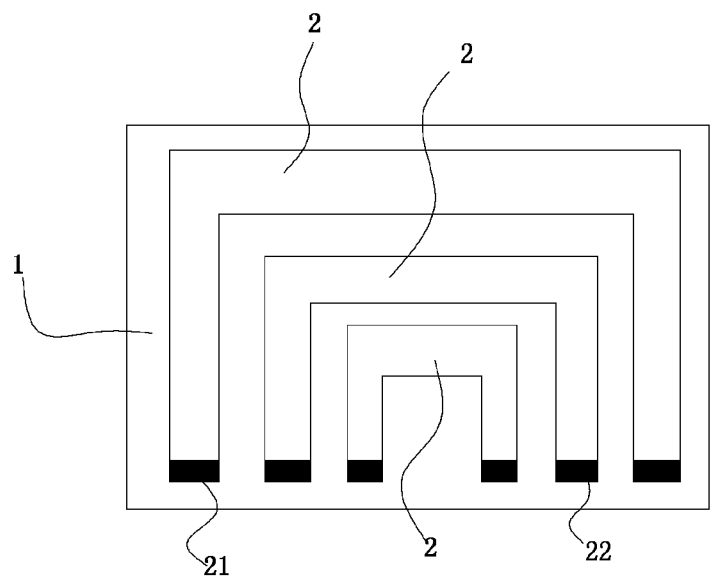
FIG. 42 is a schematic view showing a touch detecting assembly according to an embodiment of the present disclosure.
Figure 43:
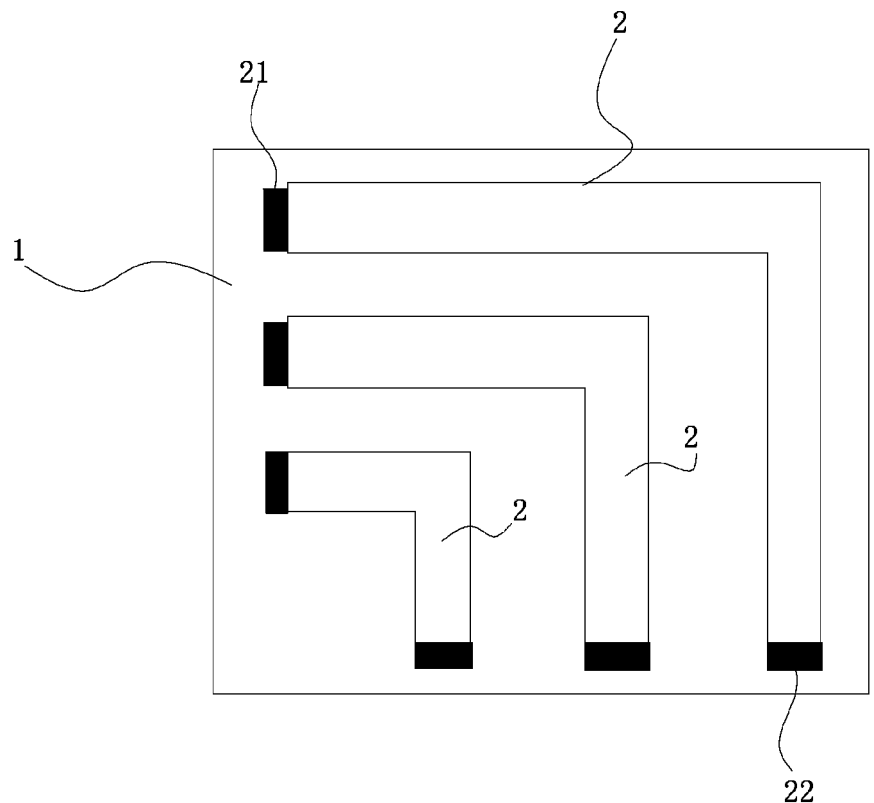
FIG. 43 is a schematic view showing a touch detecting assembly according to another embodiment of the present disclosure.

In some embodiments of the present disclosure, the touch detecting assembly 100 may comprise a plurality of L-shaped induction units 2 or substantially U-shaped induction units 2, i.e., comprise a plurality of L-shaped induction bodies 20 or substantially U-shaped induction bodies 20. As shown in FIG. 42 and FIG. 43, the plurality of induction bodies 20 have different lengths and are embedded partly one by one. In the embodiment, "embedded partly one by one" means that an outer induction body partly surrounds an inner induction body so as to achieve a comparatively large contact area while guaranteeing a detecting precision, reducing computing complexity and improving a responding speed of the touch detecting assembly 100. Apparently, those skilled in the art may adopt other embedding methods to arrange the induction bodies according to principles shown in FIG. 42 and FIG. 43.

Alternatively, as shown in FIG. 42, a distance between every two adjacent induction units 2 may be the same so that the plurality of induction units 2 may be used to uniformly divide two sides of the touch detecting assembly 100 to improve a computing speed.

Of course, in another embodiment of the present disclosure, a distance between every two adjacent induction units 2 may vary, as shown in FIG. 43. For example, since a user usually touches a central part of the touch detecting assembly 100, a distance between the induction units 2 at the central part of the touch detecting assembly 100 may be reduced to improve a detecting precision at the central part of the touch detecting assembly 100.

It should be noted that the above L-shaped induction bodies 20 or substantially U-shaped induction bodies 20 are only examples of the induction body, which may achieve a larger contact area. However, there may be variations to the embodiments shown in FIG. 42 and FIG. 43. For example, the first induction body part 201 and the second induction part 202 may not be parallel with each other.

Detections are performed at two ends of the induction unit 2 in the touch detecting assembly 100 according to the embodiments of the present disclosure. The two ends of the induction unit 2 have electrodes respectively and each electrode is connected with a corresponding pin of the control chip 200. When the touch detection is performed, the touch position may be determined on the induction unit 2.

In one embodiment, the touch position is determined according to the ratio between the first resistor R1 and the second resistor R2. Compared with the conventional diamond or triangular designs, the self capacitor doesn't need to be calculated when determining the touch position and the magnitude of the self capacitor will not influence a precision of the touch position, and thus the self capacitor detection doesn't need to be as precise as before and the detecting precision and the linearity may be improved. In addition, since any one of the first induction body to the third induction body may have a regular rectangular shape, compared with the conventional diamond or triangular designs, the linearity may be further improved.

Those skilled in the art may understand that for the induction unit 2, the specific structure is not needed, as long as a length of the induction body 20 satisfies a requirement of the touch detecting assembly 100 and the two electrodes at the two ends of the induction body 20 are connected with different pins of the control chip 200 respectively to charge or discharge the induction unit 2. The induction unit 2 may have various structures and those skilled in the art may modify or improve the induction unit based on the spirits of the present disclosure.

Figure 44:
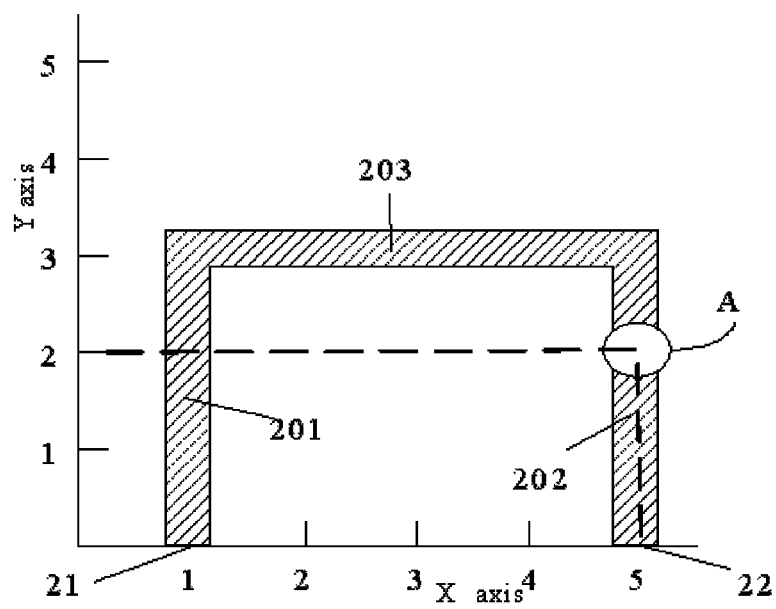
FIG. 44 is a schematic view showing that an induction body of a touch detecting assembly is touched according to an embodiment of the present disclosure, in which the induction body has a substantially U shape.

FIG. 44 is a schematic view showing that a substantially U-shaped induction unit of the touch detecting assembly 100 is touched according to embodiments of the present disclosure. As shown in FIG. 44, the touch position A is near the second electrode 22. Assume the length of the induction unit 2 has a length of ten units and the induction unit 2 is uniformly divided into 10 parts. The third induction body part 203 has a length of four units and each of the first induction body part 201 and the second induction body part 202 has a length of three units. After detection, it is known that a ratio between the first resistor and the second resistor is 4:1, i.e., a distance from the first electrode 21 to the touch position (reflected by the first resistor R1) accounts for 80% of the whole length of the induction unit 2. In other words, the touch point is at a position whose distance to the first electrode 21 is 8 units or the touch point is at a position whose distance to the second electrode 22 is 2 units. When the finger moves, the touch position may move correspondingly. Therefore, a moving trace of the finger may be determined according to a change of the touch position so that an input instruction of the user may be determined From the examples shown in FIG. 44, it is clear that a computing method of the touch detecting assembly 100 according to the embodiment of the present disclosure is simple, which may improve a responding speed of the detection of the touch detecting assembly 100.

Figure 45:
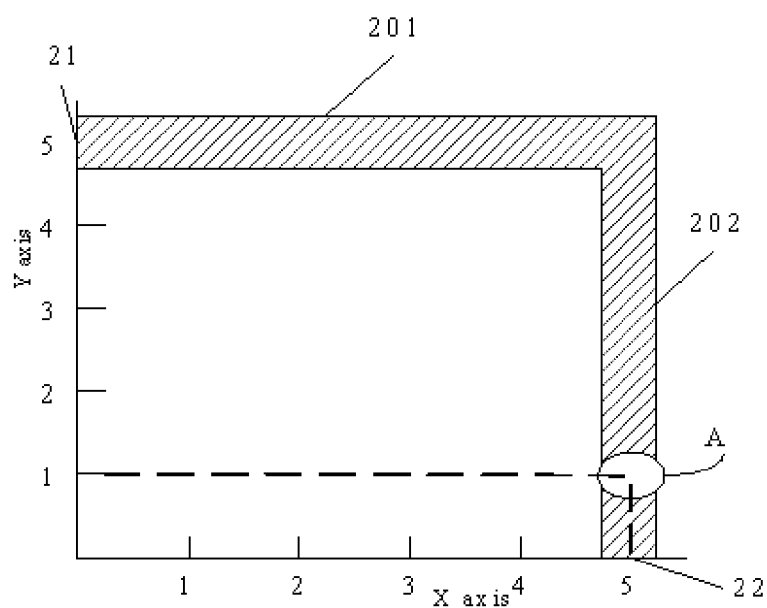
FIG. 45 is a schematic view showing that an induction body of a touch detecting assembly is touched according to an embodiment of the present disclosure, in which the induction body has a substantially L shape.

FIG. 45 is a schematic view showing that an L-shaped induction unit of the touch detecting assembly 100 is touched according to the present disclosure. As shown in FIG. 45, the touch position A is close to the second electrode 22. Assume the length of the induction body 20 has a length of ten units and the induction body 20 is uniformly divided into 10 parts. The first induction body part 201 has a length of five units and the second induction body part 202 has a length of five units. After detection, it is known that a ratio between the first resistor and the second resistor is 9:1, i.e., a distance from the first electrode 21 to the touch position (reflected by the first resistor R1) accounts for 90% of the whole length of the induction unit. In other words, the touch point is at a position whose distance to the first electrode 21 is 9 units or the touch point is at a position whose distance to the second electrode 22 is 1 unit.

From the examples shown in FIG. 45, it is clear that a computing method according to the touch detecting assembly according to the embodiment of the present disclosure is simple, which may improve a responding speed of the detection of the touch detecting assembly 100. In summary, according to an embodiment of the present discourse, level signals are applied to electrodes of the induction unit 2 at both ends of the induction unit 2. A self capacitor may be formed when the induction unit 2 is touched. Therefore, the self capacitor may be charged by the applied level signals and a touch position in a first direction may be determined according to a ratio between the first resistor R1 and the second resistor R2. For example, in one embodiment, the ratio between the first resistor R1 and the second resistor R2 is calculated according to the ratio between the first detecting value and the second detecting value obtained by detecting from the first electrode and/or the second electrode when charging or discharging the self capacitor. Therefore, the first detecting value and the second detecting value may be detected from the first electrode and/or the second electrode when charging or discharging the self capacitor. Thus, the first detecting value and the second detecting value may reflect the touch position on the induction unit and the touch position on the induction unit may be further determined.

A portable electronic device according to an embodiment of the present discourse may comprise the touch detection assembly 100 according to above-mentioned embodiments. A portable electronic device according to an embodiment of the present discourse may comprise the touch sensitive device according to above-mentioned embodiments. Other constructions such as a structure, a control and an operation of the portable electronic device according to an embodiment of the present discourse are obvious to those skilled in the art and will not be described in detail here.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that changes, alternatives, and modifications may be made in the embodiments without departing from spirit and principles of the disclosure. Such changes, alternatives, and modifications all fall into the scope of the claims and their equivalents.

What is claimed is:

1. A touch sensitive device, comprising:
   a touch detecting assembly; and
   a control chip,
      wherein said touch detecting assembly comprises:
      a substrate; and
      a plurality of induction units disposed on the substrate and not intersecting with each other, each induction unit comprising an induction body, and a first electrode and a second electrode connected with the induction body respectively,
      wherein each induction body has a plurality of empty parts, and the plurality of empty parts are arranged in a predetermined pattern to define a current passage for increasing a resistance between the first electrode and the second electrode; and
   wherein said control chip is connected with each first electrode and each second electrode,
wherein the control chip is configured to apply a level signal to each first electrode and/or each second electrode to generate a current flowing in the current passage between each first electrode and each second electrode, to charge by the current a self capacitor generated by a touch of an induction body, to calculate a ratio between a first resistor between the first electrode of at least one induction unit and the self capacitor and a second resistor between the second electrode of the at least one induction unit and the self capacitor when an induction body of the at least one induction unit is detected to be touched, and to determine a touch position of the induction body of the at least one induction unit according to the ratio between the first resistor and the second resistor.

2. The touch sensitive device according to claim 1, wherein the ratio between the first resistor and the second resistor is calculated by a ratio between a first detecting value and a second detecting value obtained by detecting at the first electrode and/or the second electrode when charging/discharging the self capacitor.

3. The touch sensitive device according to claim 1, wherein the control chip comprises one or two capacitance detecting modules.

4. A portable electronic apparatus, comprising a touch sensitive device according to claim 1.

5. The touch sensitive device according to claim 1, wherein each induction unit has a first end and a second end, the first electrode is connected with the first end of the induction unit, the second electrode is connected with the second end of the induction body, and the current passage extends between the first end and the second end in a curve, so that a length of the current passage in an extending direction of the current passage is larger than a length of the induction body.

6. The touch sensitive device according to claim 5, wherein the plurality of empty parts are divided into a first group and a second group, empty parts in each of the first group and the second group are linearly arranged in the extending direction, the empty parts in the first group correspond to and alternate with the empty parts in the second group one by one in the extending direction, and each empty part in the first group partly overlaps and a corresponding empty part in the second group in a direction orthogonal to the extending direction.

7. The touch sensitive device according to claim 6, wherein each empty part has a rectangular shape, an I shape or an H shape.

8. The touch sensitive device according to claim 5, wherein there are two current passages, one current passage is adjacent to one edge of the induction body extending in the extending direction, and the other current passage is adjacent to the other edge of the induction body extending in the extending direction.

9. The touch sensitive device according to claim 1, wherein the current passage extends between a first end and a second end of the induction body, and a cross-sectional area of the current passage in a plane orthogonal to an extending direction of the current passage is smaller than that of the induction body in the plane.

10. The touch sensitive device according to claim 9, wherein the current passage is adjacent to one edge of the induction body extending in the extending direction.

11. The touch sensitive device according to claim 10, wherein each empty part has a rectangular shape, a T shape, a U shape, an H shape, an L shape or an I shape.

12. The touch sensitive device according to claim 1, wherein each empty part penetrates through the induction body in a thickness direction of the induction body.

13. The touch sensitive device according to claim 1, wherein the plurality of empty parts are uniformly arranged at intervals.

14. The touch sensitive device according to claim 1, wherein the substrate has a rectangular shape.

* * * * *